US011788650B1

(12) United States Patent
Cohen et al.

(10) Patent No.: US 11,788,650 B1
(45) Date of Patent: Oct. 17, 2023

(54) OUTDOOR APPARATUS

(71) Applicant: Santiva Outdoors, L.L.C., Dallas, TX (US)

(72) Inventors: William Jason Cohen, Dallas, TX (US); Nicholas Zager, New York, NY (US); R Barrett Kotnik, Oswego, IL (US)

(73) Assignee: SANTIVA OUTDOORS, L.L.C., Dallas, TX (US)

(*) Notice: Subject to any disclaimer, the term of this patent is extended or adjusted under 35 U.S.C. 154(b) by 399 days.

(21) Appl. No.: 17/072,633

(22) Filed: Oct. 16, 2020

Related U.S. Application Data

(63) Continuation-in-part of application No. 16/898,531, filed on Jun. 11, 2020, now abandoned, and a
(Continued)

(51) Int. Cl.
*A01K 97/05* (2006.01)
*F16L 5/14* (2006.01)
(Continued)

(52) U.S. Cl.
CPC ............... *F16L 5/14* (2013.01); *F16L 37/025* (2013.01); *F16L 37/56* (2013.01); *A01K 97/05* (2013.01)

(58) Field of Classification Search
CPC .......... F16L 37/56; F16L 37/025; F16L 5/06; F16L 5/14; A01K 97/05
See application file for complete search history.

(56) References Cited

U.S. PATENT DOCUMENTS 1,419,549 A 6/1922 Fearnow
2,004,027 A 6/1935 Baxter
(Continued)

FOREIGN PATENT DOCUMENTS

EP 580130 A1 1/1994
FR 2965036 A1 3/2012
WO 2020172626 A1 8/2020

OTHER PUBLICATIONS

Written Opinion of the International Searching Authority in related foreign application PCT/US2021/071717, dated Feb. 2, 2022, 6 pages.
(Continued)

*Primary Examiner* — Zachary T Dragicevich
*Assistant Examiner* — James A Linford
(74) *Attorney, Agent, or Firm* — Craige Thompson; Thompson Patent Law; Timothy D. Snowden

(57) ABSTRACT

Apparatus and associated methods relate to a bi-directional conduit system including a core configured to traverse a container wall and having independent, substantially parallel lumens and a fitting fluidly connected to each lumen on each side of the wall. In an illustrative example, the conduit system may include at least one valve configured to selectively restrict fluid flow in at least one lumen. The core may be flexible. A coupling assembly may be configured to releasably couple the core to the wall. Apparatus and methods further relate to a system including a base module with a control input and a fluid transport system including an impeller powered by the base module to convey fluid via a conduit in response to the control input, wherein in a stowage mode, the base module is configured to store the conduit and to mechanically support, releasably coupled, the impeller to the base module.

14 Claims, 11 Drawing Sheets

Related U.S. Application Data continuation-in-part of application No. 16/798,213, filed on Feb. 21, 2020, now Pat. No. 11,008,030.

(60) Provisional application No. 63/089,921, filed on Oct. 9, 2020, provisional application No. 63/055,311, filed on Jul. 22, 2020, provisional application No. 63/053,221, filed on Jul. 17, 2020, provisional application No. 63/053,227, filed on Jul. 17, 2020, provisional application No. 62/943,084, filed on Dec. 3, 2019, provisional application No. 62/916,085, filed on Oct. 16, 2019, provisional application No. 62/916,083, filed on Oct. 16, 2019, provisional application No. 62/914,687, filed on Oct. 14, 2019, provisional application No. 62/907,242, filed on Sep. 27, 2019, provisional application No. 62/862,526, filed on Jun. 17, 2019, provisional application No. 62/860,083, filed on Jun. 11, 2019, provisional application No. 62/809,365, filed on Feb. 22, 2019.

(51) Int. Cl.
*F16L 37/56* (2006.01)
*F16L 37/02* (2006.01)

(56) References Cited

U.S. PATENT DOCUMENTS

| | | | |
|---|---|---|---|
| 2,148,196 | A | 2/1939 | Falk |
| 3,191,337 | A | 6/1965 | Fant |
| 3,452,469 | A | 7/1969 | White |
| 3,966,340 | A | 6/1976 | Morris |
| 4,128,170 | A | 12/1978 | Elliott |
| 4,197,890 | A | 4/1980 | Simko |
| 4,213,310 | A | 7/1980 | Buss |
| 4,299,221 | A | 11/1981 | Phillips et al. |
| 4,407,089 | A | 10/1983 | Miller |
| 4,945,672 | A | 8/1990 | Raia |
| 5,231,789 | A | 8/1993 | Radmanovich |
| 5,249,823 | A | 10/1993 | McCoy et al. |
| 5,313,817 | A | 5/1994 | Meinders |
| 5,342,126 | A | 8/1994 | Heston et al. |
| 5,465,996 | A | 11/1995 | Wisz |
| 5,471,779 | A | 12/1995 | Downey |
| 5,480,170 | A | 1/1996 | Kaiser |
| 5,513,940 | A | 5/1996 | Florentin et al. |
| 5,822,916 | A | 10/1998 | Power |
| 5,871,335 | A | 2/1999 | Bartlett |
| 5,988,601 | A | 11/1999 | Burgess |
| 5,988,658 | A | 11/1999 | Ritchie et al. |
| 6,101,759 | A | 8/2000 | Power |
| 6,290,690 | B1 | 9/2001 | Huculak et al. |
| 6,467,779 | B1 | 10/2002 | Mills |
| 6,474,097 | B2 | 11/2002 | Treppedi et al. |
| D472,384 | S | 4/2003 | Richardson |
| 6,550,791 | B2 | 4/2003 | Ramsey |
| 6,558,317 | B2 | 5/2003 | Takahashi et al. |
| D486,357 | S | 2/2004 | Leba et al. |
| 6,836,998 | B1 | 1/2005 | Rucker |
| 6,923,468 | B1 | 8/2005 | Barnett et al. |
| D513,123 | S | 12/2005 | Richardson et al. |
| D513,451 | S | 1/2006 | Richardson et al. |
| D516,309 | S | 3/2006 | Richardson et al. |
| D516,807 | S | 3/2006 | Richardson et al. |
| 7,014,222 | B1 | 3/2006 | Poppe |
| D527,226 | S | 8/2006 | Maldonado |
| D528,368 | S | 9/2006 | Maldonado |
| D529,344 | S | 10/2006 | Maldonado |
| 7,140,507 | B2 | 11/2006 | Maldonado et al. |
| 7,389,608 | B1 | 6/2008 | MacKay |
| 7,963,530 | B1 | 6/2011 | Garcia |
| 8,020,880 | B2 | 9/2011 | Zhu |
| 8,453,771 | B1 | 6/2013 | Hirschfeld |
| 8,572,889 | B1 | 11/2013 | Hughes et al. |
| 8,615,921 | B1 | 12/2013 | Weems |
| D712,720 | S | 9/2014 | Seiders |
| D712,721 | S | 9/2014 | Seiders |
| D712,722 | S | 9/2014 | Seiders |
| D712,723 | S | 9/2014 | Seiders |
| D714,125 | S | 9/2014 | Seiders |
| 8,910,819 | B2 | 12/2014 | Seiders |
| 8,925,752 | B2 | 1/2015 | Smith |
| D727,457 | S | 4/2015 | Seiders |
| 9,010,770 | B2 | 4/2015 | Cantrell |
| D731,614 | S | 6/2015 | Seiders |
| 9,067,614 | B2 | 6/2015 | Vanderberg et al. |
| 9,139,352 | B2 | 9/2015 | Seiders et al. |
| 9,187,232 | B2 | 11/2015 | Seiders |
| 9,278,704 | B2 | 3/2016 | Cates |
| 9,316,428 | B2 | 4/2016 | Mech |
| D757,637 | S | 5/2016 | Horowitz |
| 9,366,467 | B2 | 6/2016 | Kiedaisch et al. |
| 9,415,787 | B2 | 8/2016 | Mericle |
| 9,616,910 | B2 | 4/2017 | Chaloux et al. |
| 9,694,521 | B2 | 7/2017 | French et al. |
| D797,821 | S | 9/2017 | Seiders et al. |
| 9,796,517 | B2 | 10/2017 | Seiders et al. |
| D804,903 | S | 12/2017 | Mason et al. |
| 9,834,342 | B2 | 12/2017 | Seiders |
| D809,869 | S | 2/2018 | Seiders et al. |
| 9,902,548 | B2 | 2/2018 | Seiders et al. |
| 9,913,464 | B1 | 3/2018 | Stokes |
| 9,919,459 | B2 | 3/2018 | French et al. |
| 9,919,460 | B2 | 3/2018 | French et al. |
| 9,956,978 | B1 | 5/2018 | Worley |
| D820,647 | S | 6/2018 | Rane et al. |
| D820,648 | S | 6/2018 | Rane et al. |
| D821,155 | S | 6/2018 | Rane et al. |
| D821,156 | S | 6/2018 | Rane et al. |
| D821,157 | S | 6/2018 | Rane et al. |
| D821,824 | S | 7/2018 | Rane et al. |
| D823,064 | S | 7/2018 | Eichinger et al. |
| D823,065 | S | 7/2018 | Eichinger et al. |
| D823,066 | S | 7/2018 | Eichinger et al. |
| 10,029,842 | B2 | 7/2018 | Seiders et al. |
| 10,046,885 | B2 | 8/2018 | Sonntag et al. |
| 10,046,900 | B2 | 8/2018 | Seiders |
| D828,028 | S | 9/2018 | Seiders et al. |
| D828,029 | S | 9/2018 | Seiders et al. |
| 10,071,303 | B2 | 9/2018 | Pikulski |
| D830,116 | S | 10/2018 | Seiders et al. |
| 10,098,335 | B2 | 10/2018 | Cooper |
| 10,105,615 | B2 | 10/2018 | Rogozinski |
| 10,633,009 | B2 | 4/2020 | Webber et al. |
| 2002/0109243 | A1 | 8/2002 | Vento |
| 2007/0074795 | A1 | 4/2007 | Moore |
| 2007/0143956 | A1 | 6/2007 | Kumakura et al. |
| 2008/0028667 | A1 | 2/2008 | Grzybowski |
| 2008/0185493 | A1 | 8/2008 | Wakefield et al. |
| 2009/0188152 | A1 | 7/2009 | Davin |
| 2012/0085019 | A1 | 4/2012 | Link |
| 2013/0207360 | A1 | 8/2013 | Vanderberg et al. |
| 2016/0120163 | A1 | 5/2016 | Arden et al. |
| 2016/0326765 | A1 | 11/2016 | Barbret |

OTHER PUBLICATIONS

Amazon.com□: Frabill 1436 Fishing Equipment Fish Containers, Multi□: Sports & Outdoors. https://www.amazon.com/Frabill-Floating-Pump-System-30-Gallon/dp/B00OY9HSJO.

Amazon.com: Rokform 335499 Belt Clip for all RokLock twist lock cases made from Aluminum and Stainless Steel, Black. https://www.amazon.com/Rokform-RokLock-twist-Aluminum-Stainless/dp/B0198U4LQG.

Badger Wheels by Cooler Extras | Premium Yeti Wheels. http://www.coolerextras.com/wheels/.

Battery operated submersible pump,DC for center piece fountains—Fountains n Slate, Fountain Pumps, Lights, Plugs and Supplies, https://www.fountainsnslate.com/inc/sdetail/4327.

Carolina Coolerworks. http://www.coolerworks.com.

(56) References Cited

OTHER PUBLICATIONS

Creek, K. Malibu Kayaks Livewell Pump Kit | Stealth Series. https://kayakcreek.com/products/malibu-kayaks-livewell-pump-kit-stealth-series.
ECO FLO 1/55 HP Battery Powered Utility Pump-BSUP. https://www.homedepot.com/p/ECO-FLO-1-55-HP-Battery-Powered-Utility-Pump-BSUP/207061069.
Eley Garden Hose Reel Covers—Eley Hose Reels. https://www.eleyhosereels.com/collections/hose-reel-accessories/products/garden-hose-reel-covers.
Igloo Trailmate Journey 70 Qt Cooler. https://www.igloocoolers.com/products/trailmate-journey-70-qt-cooler.
International Search Report in related foreign application PCT/US2020/019357, dated Apr. 28, 2020. 4 pages.
Marine Metals Airhead Floating Aerator | West Marine. https://www.westmarine.com/buy/marine-metals--airhead-floating-aerator-401671.
Marine Metals Fish Saver Aerator Pump | West Marine. https://www.westmarine.com/buy/marine-metals-fish-saver-aerator-pump--304438.
Marine Metals Quiet Bubbles Aerator Pump | West Marine. https://www.westmarine.com/buy/marine-metals--quiet-bubbles-aerator-pump-1184076.
Multi Grommet. https://www.csidesigns.com/products/piping-accessories/pipetite/multi-grommet.
Ozark Trail High Performance Cooler Wheel Kit. /ip/Ozark-Trail-High-Performance-Cooler-Wheel-Kit/753017914.
Pinson, H. A better way of connecting multiple patients to a single ventilator. https://medium.com/@pinsonhannah/a-better-way-of-connecting-multiple-patients-to-a-single-ventilator-fa9cf42679c6. Apr. 13, 2020.
Quad Lock run kit iPhone 7 Plus/8 Plus sports armband online.com. https://www.triathlon-accessories.com/running/running-accessories/quad-lock-run-kit-iphone-7-plus-8-plus-sports-armband/.
Rapala RCD Water Activated Floating Aerator Pump—Floating Live Bait Pump. /rapala-rcd-water-activated-floating-aerator-pump-f.
Seaflo 800 GPH 12 V Boat Livewell Baitwell Aerator Aeration Pump 4.0A Submersible Bait Tank Pump Replace Rule Johnson Pump|rule pump|gph pump|pump aerator—AliExpress. //www.aliexpress.com/item/32764700277.html.
Sherpa Wheels—Carts for Coolers. https://sherpawheels.com/.
Solutions, N. B. Speidel Ball Lock Gas in with Pressure Relief Valve. NorCal Brewing Solutions. https://www.norcalbrewingsolutions.com/store/Speidel-Ball-Lock-Gas-In-with-Pressure-Relief-Valve.html.
Standard Wheel Original Badger WheelsTM—Single Axle (Fits Tundra 35-45-50-65-75-105-110-125-160). http://www.coolerextras.com/standard-wheel-original-badger-wheels-single-axle-fits-tundra-35-45-50-65-75-105-110-125-160/.
Twist Lock. https://domite.com/twist-lock/.
Water Source. Battery Operated Utility Pump. Northern Tool. https://www.northerntool.com/images/downloads/manuals/47650.pdf.
Wholesale Portable LIFAN Fire Fighting Pump Mobile High Pressure Water Mist Gun in Chinese—Hubei Dong Runze Special Vehicle Equipment Co., Ltd. http://www.truckinchina.com/Portable-LIFAN-Fire-Fighting-Pump-Mobile-High-Pressure-Water-Mist-Gun-Fire-Hose-Reel-30M-pd44614057.html.
Written Opinion of the International Searching Authority in related foreign application PCT/US2020/019357, dated Apr. 28, 2020. 6 pages.

OUTDOOR APPARATUS

CROSS-REFERENCE TO RELATED APPLICATIONS

This application is a continuation-in-part of U.S. Utility application Ser. No. 16/898,531, titled "MULTI-FUNCTIONAL WATER AERATION CONDUIT FOR A CONTAINER DRAIN OUTLET," filed by William Jason Cohen, et al., on Jun. 11, 2020, which claims the benefit of both U.S. Provisional Application Ser. No. 62/914,687, titled "IMPROVED MULTI-FUNCTIONAL WATER AERATION CONDUIT FOR A CONTAINER DRAIN OUTLET," filed by William Jason Cohen, et al., on Oct. 14, 2019, and also U.S. Provisional Application Ser. No. 62/860,083, titled "MULTI-FUNCTIONAL WATER AERATION CONDUIT FOR A CONTAINER DRAIN OUTLET," filed by William Jason Cohen, et al., on Jun. 11, 2019.

This application claims the benefit of U.S. Provisional Application Ser. No. 62/916,083, titled "PUMP SYSTEM FOR BAIT TANK MAINTENANCE INCLUDING AT LEAST ONE PUMP UNIT MOUNTABLE TO AT LEAST ONE BASE UNIT," filed by William Jason Cohen, et al., on Oct. 16, 2019.

This application claims the benefit of U.S. Provisional Application Ser. No. 63/053,227, titled "MULTI-FUNCTIONAL WATER AERATION CONDUIT FOR A CONTAINER DRAIN OUTLET," filed by William Jason Cohen, et al., on Jul. 17, 2020.

This application claims the benefit of U.S. Provisional Application Ser. No. 63/053,221, titled "CONTAINER UNDERCARRIAGE SYSTEM," filed by William Jason Cohen, et al., on Jul. 17, 2020.

This application claims the benefit of U.S. Provisional Application Ser. No. 63/055,311, titled "CONTAINER UNDERCARRIAGE SYSTEM," filed by William Jason Cohen, et al., on Jul. 22, 2020.

This application claims the benefit of U.S. Provisional Application Ser. No. 63/089,921, titled "IMPROVED OUTDOOR APPARATUS," filed by William Jason Cohen, et al., on Oct. 9, 2020.

This application is a continuation-in-part of U.S. Utility application Ser. No. 16/798,213, titled "Adaptable Modular Attachment and Accessory System for Use with Coolers, Bait Buckets and Other Containers," filed by William Jason Cohen, et al., on Feb. 21, 2020, which claims the benefit of: U.S. Provisional Application Ser. No. 62/809,365, titled "Modular Attachment and Accessory System for Containers," filed by William Jason Cohen, et al., on Feb. 22, 2019; U.S. Provisional Application Ser. No. 62/862,526, titled "Modular Attachment and Accessory System for Cooler, Bait Bucket, and Cart Devices," filed by William Jason Cohen, et al., on Jun. 17, 2019; U.S. Provisional Application Ser. No. 62/907,242, titled "MODULAR ATTACHMENT AND ACCESSORY SYSTEM FOR BAIT BUCKETS," filed by William Jason Cohen, et al., on Sep. 27, 2019; U.S. Provisional Application Ser. No. 62/916,085, titled "Adaptable Modular Attachment and Accessory System for Fitting Containers of Varying Sizes," filed by William Jason Cohen, et al., on Oct. 16, 2019; and U.S. Provisional Application Ser. No. 62/943,084, titled "Coupler Assembly for Mechanically Securing a Cooler to a Cooler Undercarriage System," filed by William Jason Cohen, et al., on Dec. 3, 2019.

This application incorporates the entire contents of the foregoing application(s) herein by reference.

Furthermore, this application incorporates the entire contents of the following application(s) herein by reference: U.S. Design Application Serial No. 29/681,056, titled "ACCESSORY ATTACHMENT RACK," filed by William Jason Cohen, et al., on Feb. 22, 2019; and PCT Utility Application Serial No. PCT/US20/19357, titled "Adaptable Modular Attachment and Accessory System for Use with Coolers, Bait Buckets and Other Containers," filed by William Jason Cohen, et al., on Feb. 21, 2020.

TECHNICAL FIELD

Various embodiments relate generally to fluid movement, such as between fluid sources, fluid reservoirs, and drain locations.

BACKGROUND

Fishing sports may often include the use, for example, of live bait, include capture of creatures (e.g., fish and other aquatic creatures), or both. Maintenance of the live bait or captured creatures may require maintenance of an environment with, for example, adequate levels of oxygen, adequate exchange of water (e.g., to remove waste products), a controlled temperature range, or some combination thereof.

Fishermen may use a wide variety of containers as a habitat for live aquatic creatures including, for example, ice chests, coolers, buckets, commercial live wells, bait tanks, and bait buckets. These habitats may include, for example, various supply tubes, drain tubes, water pumps, bilge pumps, drain pumps, aerators, and often some combination thereof.

SUMMARY

Apparatus and associated methods relate to a bi-directional conduit system including a core configured to traverse a container wall and having independent, substantially parallel lumens and a fitting fluidly connected to each lumen on each side of the wall. In an illustrative example, the conduit system may include at least one valve configured to selectively restrict fluid flow in at least one lumen. The core may be flexible. A coupling assembly may be configured to releasably couple the core to the wall. Apparatus and methods further relate to a system including a base module with a control input and a fluid transport system including an impeller powered by the base module to convey fluid via a conduit in response to the control input, wherein in a stowage mode, the base module is configured to store the conduit and to mechanically support, releasably coupled, the impeller to the base module.

Various embodiments may advantageously provide a plurality of separate channels of fluid communication between an interior and an exterior of a fluid reservoir through a single aperture through a wall thereof. For example, some embodiments may advantageously provide for exchange of air and water in a fluid reservoir such as, for example, a bait container or livewell via a multi-lumen conduit system by, for example, a modular pump system. Some embodiments may advantageously flexibly contour to allow a multi-port fitting connected to a multi-lumen conduit to be advantageously oriented within a fluid reservoir, such as, for example, in an ice chest or other container with a depressed or otherwise contoured bottom leading to a pre-existing drain port. Some embodiments may advantageously provide for one-way communication of fluid (e.g., two separate fluids such as water and air) through two independent lumens of a conduit system, and unrestricted communication of fluid through a third lumen. Various embodiments may, for example, advantageously maintain a livable and sustainable habitat for live bait stored in a fluid reservoir container. Various couplers and conduits may, for example, advantageously cooperate to deliver optimal fluid (including both gaseous and liquid fluid) egress and ingress (e.g., exhaust and/or aspiration) out of and/or into a bait container, and may advantageously reduce the effort required for proper maintenance of live bait within the container.

In various embodiments, a modular pump system may advantageously be transitioned between a stowage mode and a deployed mode. A stowage mode may, for example, advantageously provide a compact assembly configuration such as, for example, for transport and storage. A deployed mode may, for example, advantageously provide for a portable power supply and control unit for a water pump, an air pump, or both. Various embodiments may advantageously provide fluids such as water and air through independent lumens in one or more multi-lumen conduit to provide optimal fluid exchange in one or more fluid reservoirs.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a bi-directional multi-lumen conduit and modular pump system is introduced with reference to FIG. 1. Second, that introduction leads into a description with reference to FIGS. 2A-2G of some exemplary embodiments of a tri-lumen bi-directional conduit system. Third, with reference to FIGS. 3A-3C, some exemplary embodiments of a bi-lumen bi-directional conduit system is described. Fourth, with reference to FIGS. 4A-4C, the discussion turns to exemplary embodiments that illustrate a modular pump system. Finally, the document discusses further embodiments, exemplary applications and aspects relating to a bi-directional multi-lumen conduit and modular pump system.

Figure 1:
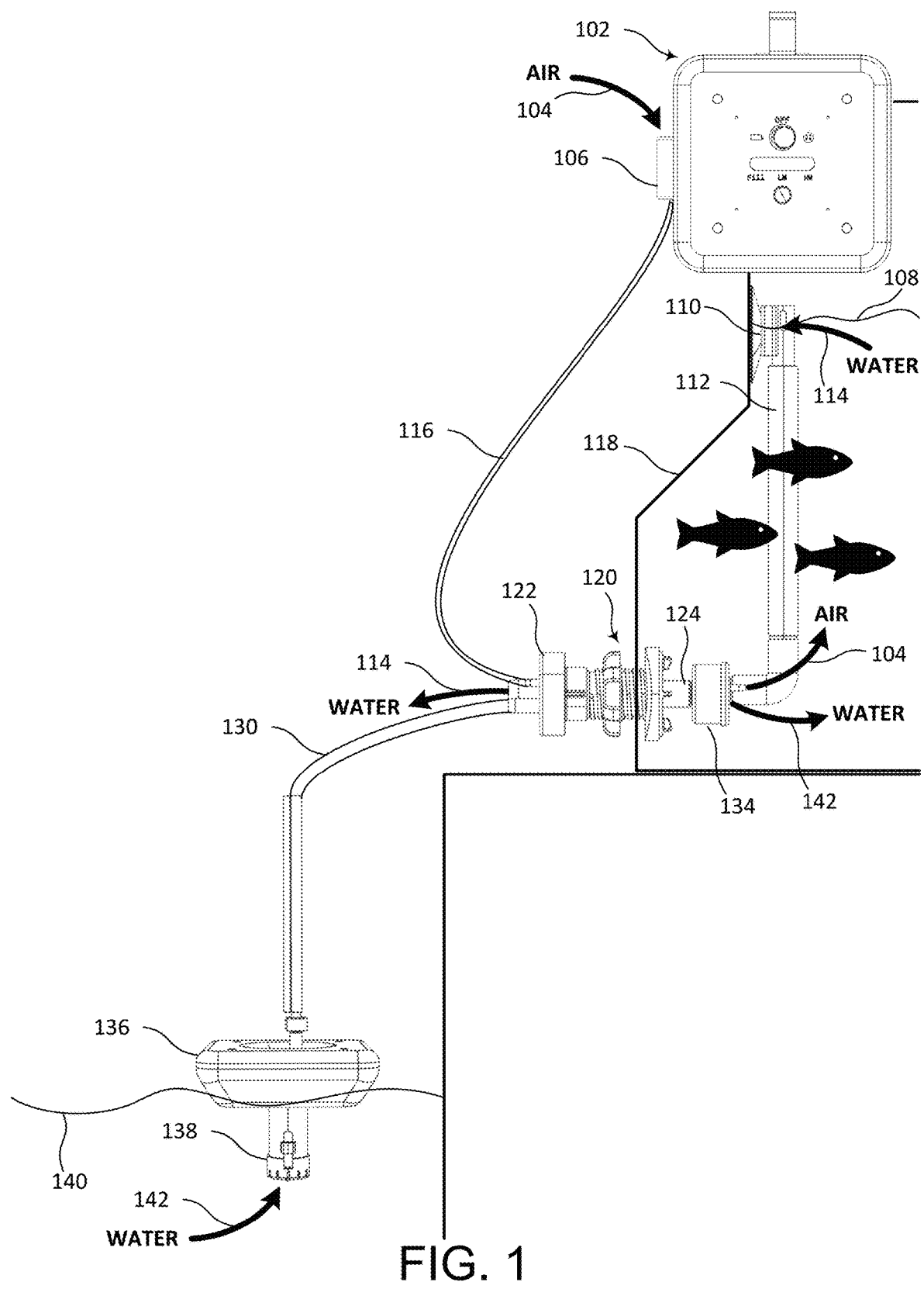
FIG. 1 depicts an exemplary bi-directional conduit system in an exemplary use case traversing a container wall at a drain outlet of the container, and fluidly connected to an exemplary modular pump system to provide air and water exchange in the container.

FIG. 1 depicts an exemplary bi-directional conduit system in an exemplary use case traversing a container wall at a drain outlet of the container, and fluidly connected to an exemplary modular pump system to provide air and water exchange in the container. A multi-lumen conduit core 124 traverses the wall of fluid reservoir 118. The conduit core 124 passes through, and is releasably coupled to the wall of reservoir 118 by, coupling assembly 120. Fitting 122 and bell fitting 134 are coupled to opposite ends of the conduit core 124, and may advantageously provide independent access to the respective independent lumens of the multi-lumen conduit core from an interior and an exterior of the reservoir 118. A conduit riser 112 is connected to one lumen of conduit 124 via bell fitting 134, and is repositionably secured to an interior wall of fluid reservoir 118 by suction cup 110.

A modular pump system is in a deployed mode. Base unit 102 of the modular pump system is releasably coupled to the wall of reservoir 118, and provides power and control (signal and energy conveyance means not shown) to air pump 106 and water pump 138. Water pump 138 is releasably coupled to float 136, and pumps water 142 from water source 140, through conduit 130, through a lumen of core 124, and into reservoir 118. Air pump 106 intakes air 104, pumps it through conduit 116, through a separate lumen of core 124, and into reservoir 118. Excess air, water, or both exit fluid reservoir 118 through riser conduit 112, and out through another separate lumen of core 124. Accordingly, air and water may be advantageously exchanged in a fluid reservoir (such as a bait container or livewell) via the multi-lumen conduit system by, for example, using the exemplary modular pump system.

In the depicted exemplary embodiment, the fluid reservoir 118 may, by way of example and not limitation, be a bucket (e.g., a plastic bucket), an ice chest, cooler, or other suitable container. The conduit may traverse the wall of the reservoir 118, for example, through a pre-existing hole. The pre-existing hole may be, by way of example and not limitation, an existing drain hole (e.g., for draining an ice chest or cooler). Coupling assembly 120 may thread into or otherwise releasably couple to the wall via or through the pre-existing hole. The multi-lumen conduit core 124 may then pass through the coupling system, and couple thereto, for example, by a retaining lip. Conduit core 124 may, for example, be flexible and so may, for example, advantageously flexibly contour to allow fitting 134 to be advantageously oriented within reservoir 118 (e.g., in an ice chest or other container with a depressed or otherwise contoured bottom leading to a drain port).

Bell fitting 134 and fitting 122 may each provide a plurality of ports (e.g., hose barbs, apertures, or other appropriate ports), each of which may be independently fluidly connected to at least one end of respective independent lumens of the conduit core 124. For example, as depicted, riser conduit 112 is connected to one of the ports of bell fitting 134. At least a portion of riser conduit 112 may, for example, be flexible (e.g., flexible tubing), and so may be advantageously vertically repositioned. For example, a user may reposition suction cup 110, and so determine a fluid level 108 to be maintained in reservoir 118. Air and water 114 escaping via riser conduit 112 may enter a port of bell fitting 134, pass through the wall of reservoir 118 via an independent lumen of conduit 124 connected to the port of bell fitting 134, and exit a respective port of fitting 122. A user may, for example, connect a conduit (e.g., a flexible drain tube) to that port of fitting 122 and so, for example, advantageously direct the escaping water, air, or both.

The modular pump system may be, for example, deployed from a stowage mode in which pump 138 and float 136 are individually releasably coupled to the base unit 102. Pump 138 is releasably assembled to float 136, and may be powered via an energy transfer means (e.g., a cable, not shown) by base unit 102. Pump 138 may pump water 142 from source 140, through conduit 130 (e.g., flexible tubing), through port of fitting 122, through the wall of reservoir 118 via an independent lumen of conduit core 124, and into reservoir 118 through a port of bell fitting 134. Flow of water may be controlled, for example, by controlling operation of pump 138 via base unit 102. In various embodiments, for example, at least one water distribution device (e.g., a manifold) may be connected to the port of bell fitting 134 (e.g., directly or through a conduit such as flexible tubing) and may be positioned in a desired location. For example, a manifold may be provided to allow water to 'sprinkle' the water into the fluid reservoir 118 at one or more locations as desired by a user.

Air pump 106 may be powered by base unit 102 via an energy transfer means (e.g., a cable, not shown). Air pump 106 may pump air 104 through conduit 116 (e.g., flexible tubing), through a port of fitting 122, through the wall of reservoir 118 via an independent lumen of conduit core 124, and into reservoir 118 via a port of bell fitting 134. In various embodiments, for example, an aerator device (e.g., an aeration pipe having multiple exit apertures) may be connected to the port of bell fitting 134 (e.g., directly or through a conduit such as flexible tubing) and may be positioned in a desired location.

Figure 2A:
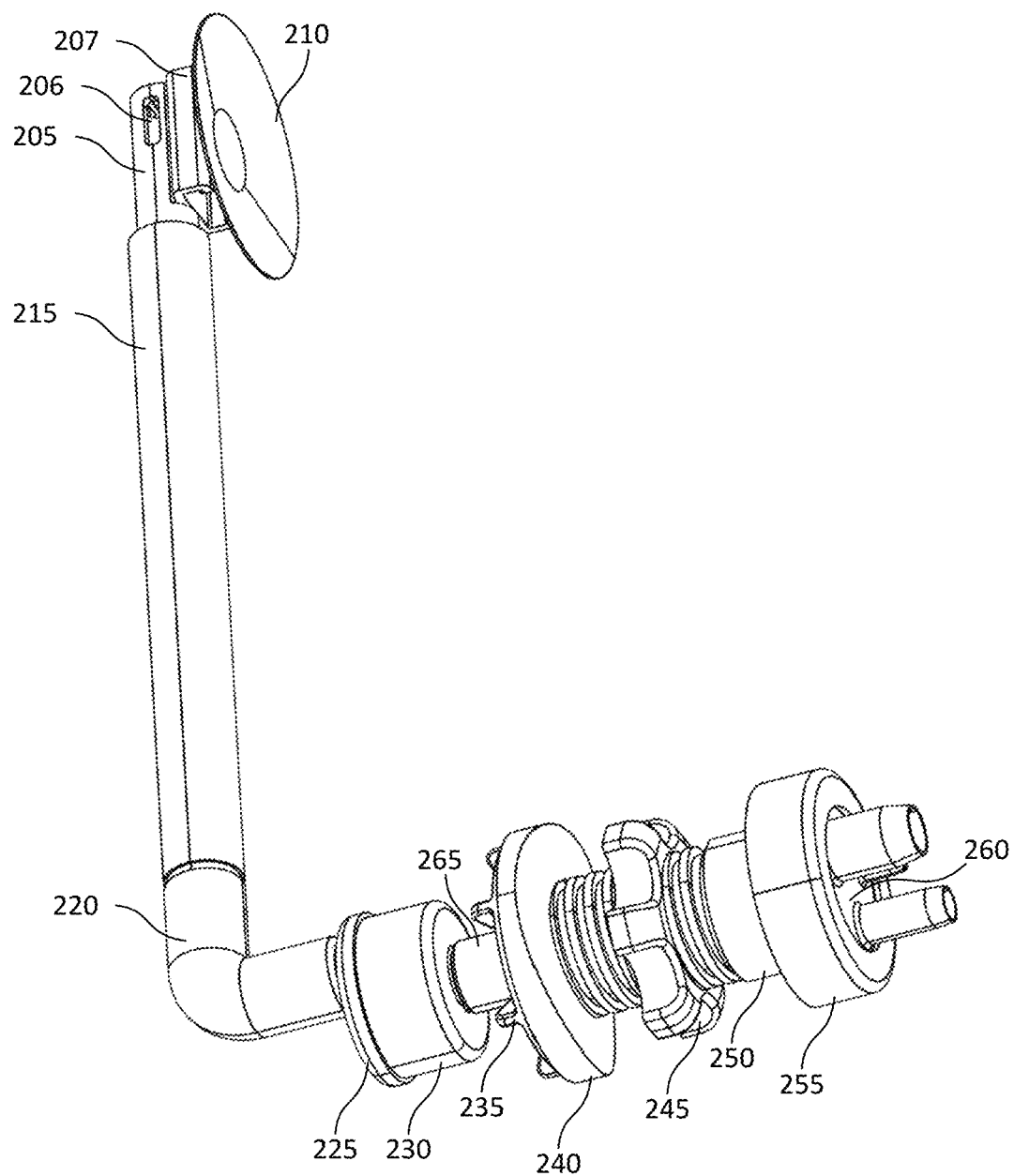
FIG. 2A depicts a perspective view of an exemplary assembled tri-lumen bi-directional conduit system.

FIG. 2A depicts a perspective view of an exemplary assembled tri-lumen bi-directional conduit system. Cap 225 couples to bell fitting 230. Bell fitting 230 releasably couples to conduit core 265. Conduit core 265 couples to fitting 260. Together, at least cap 225, bell fitting 230, conduit core 265, and fitting 260 connect together such that respective lumens, channels, cavities, apertures, and ports fluidly connect to form N independent lumens beginning at an aperture or port in cap 225 through to a port or aperture in fitting 260. Each independent lumen may, for example, provide a fluid channel through the conduit system which is fluidly independent of other independent lumens. Accordingly, various embodiments may advantageously provide a plurality of separate channels of fluid communication between an interior and an exterior of a fluid reservoir through a single aperture through a wall thereof.

In the depicted example, riser conduit 215 is connected at a proximal end to a port of cap 225 via an exemplary elbow fitting 220. Through cap 225, the riser conduit 215 may be connected to a single interconnected independent lumen through the cap 225, bell fitting 230, conduit core 235, and fitting 260. As depicted, the riser conduit 215 is provided at a distal end with a drain fitting 205. The drain fitting 205 is provided with at least one aperture 206 (and may, for example, be provided with a plurality of apertures on, for example, the side wall or the top such as having an integrated screen) fluidly connected through the drain fitting 205 to the riser conduit 215. The drain fitting 205 is provided with a coupler attachment 207. Suction cup 210 is releasably coupled to coupler attachment 207. Suction cup 210 may, for example, be releasably and repositionably coupled to a container wall. Accordingly, the position (e.g., height in a fluid reservoir) of the drain coupler 205 may, for example, be adjusted by a user by repositioning the suction cup 210 on the fluid reservoir wall.

The conduit may, for example, provide fluid communication between an interior and exterior of a fluid reservoir through a wall of the fluid reservoir. The conduit may, for example, be installed through a pre-existing aperture in the wall such as, by way of example and not limitation, a drain port or spigot port in a cooler, ice chest, drinking water container, or other suitable container. Depicted coupling components include reservoir adapter 235, nut 245, and contoured gasket 240. The coupling components may, for example, advantageously clamp to a container wall between nut 245 and a flange of adapter 235. Retaining ring 255 screws over threaded adapter 250, thereby clamping fitting 260 and a retaining lip of conduit core 265 between the retaining ring 255 and threaded adapter 250. Threaded coupler 250 may, by way of example and not limitation, thread into reservoir adapter 235, or directly into a threaded aperture in the reservoir wall (e.g., in a threaded drain cooler or ice chest drain port). The bell fitting 230 may, for example, be removed from the conduit core 265 to enable the conduit core 265 to pass through the wall and appropriate coupling elements. Bell fitting 230 may, for example, slidingly assemble (e.g., via a friction fit) into the conduit core 265.

Figure 2B:
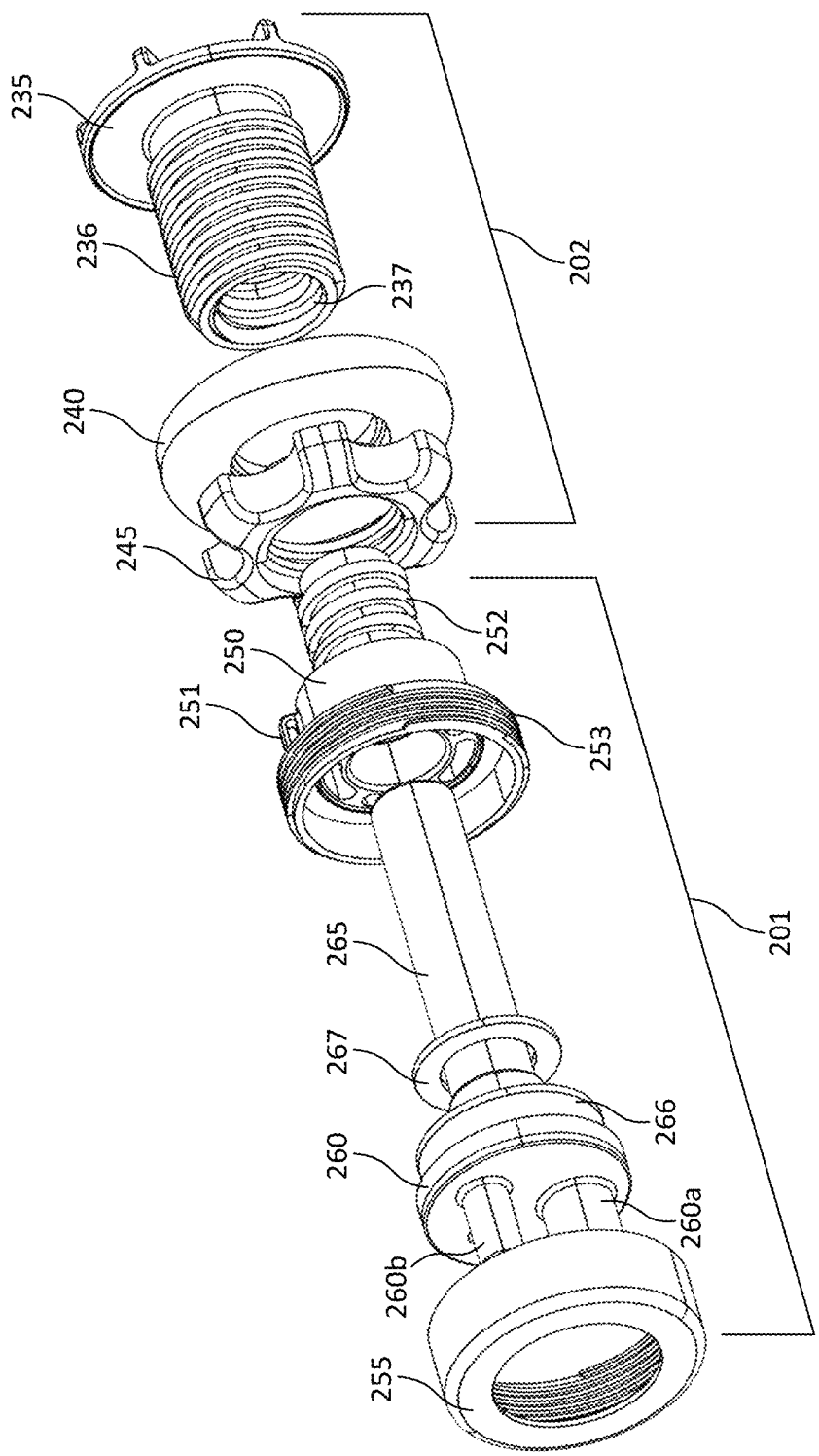
FIG. 2B depicts an exploded perspective view of selected exemplary wall-traversing and coupling elements of the exemplary bi-directional conduit system of FIG. 2A.

FIG. 2B depicts an exploded perspective view of selected exemplary wall-traversing and coupling elements of the exemplary bi-directional conduit system of FIG. 2A. Subassembly 201 includes elements which couple together to form a conduit assembly having a plurality of independent lumens substantially traversing longitudinally therethrough. Fitting 260 and conduit core 265 axially assemble and are rotationally oriented to align N lumens, apertures, or other fluid passages (where N is an integer value greater than or equal to 1, and N=3 in the depicted embodiment) in each component with N fluid passages of the adjoining component to form N fluid passages through the assembled components. Retaining ring 255 threadedly couples to threads 253 of threaded adapter 250, thereby releasably clamping fitting 260, retaining lip 266 of conduit core 265, and gasket 267 therebetween to form subassembly 201. Fitting 260 is provided with port 260a, 260b, and 260c (not visible in FIG. 2B), each of which are separately in fluid communication with respective lumens in conduit core 265.

Coupling subassembly 202 includes coupling adapter 235, contoured gasket 240, and nut 245. The nut threadedly engages threads 236 of coupling adapter 235. Coupling subassembly 202 may, for example, releasably clamp the wall of a container by passing the threaded (236) portion of coupling adapter 235 through an aperture of the wall, and clamping the wall and contoured gasket 240 between nut 245 and the flange of coupling adapter 235.

Conduit core 265 extends axially through threaded adapter 250. Threaded adapter 250 may, for example, threadedly engage directly with an appropriately threaded aperture in a wall of a container (e.g., a threaded drain port), or may threadedly engage with inner threads 237 of coupling adapter 235. By way of example and not limitation, coupling subassembly 202 may be releasably coupled through, for example, a bucket wall and subassembly 201 may be threadedly coupled into coupling subassembly 201, thereby releasably coupling subassembly 201 through the bucket (or other container) wall. Accordingly, a multi-lumen conduit may, for example, be advantageously coupled through a single aperture in a container wall to provide fluid communication, by way of example and not limitation, between an exterior and an interior of a container or between two reservoirs (e.g., two chambers of a single container, two adjoining containers, a large reservoir and a smaller reservoir, or an outer reservoir and an inner reservoir).

Figure 2C:
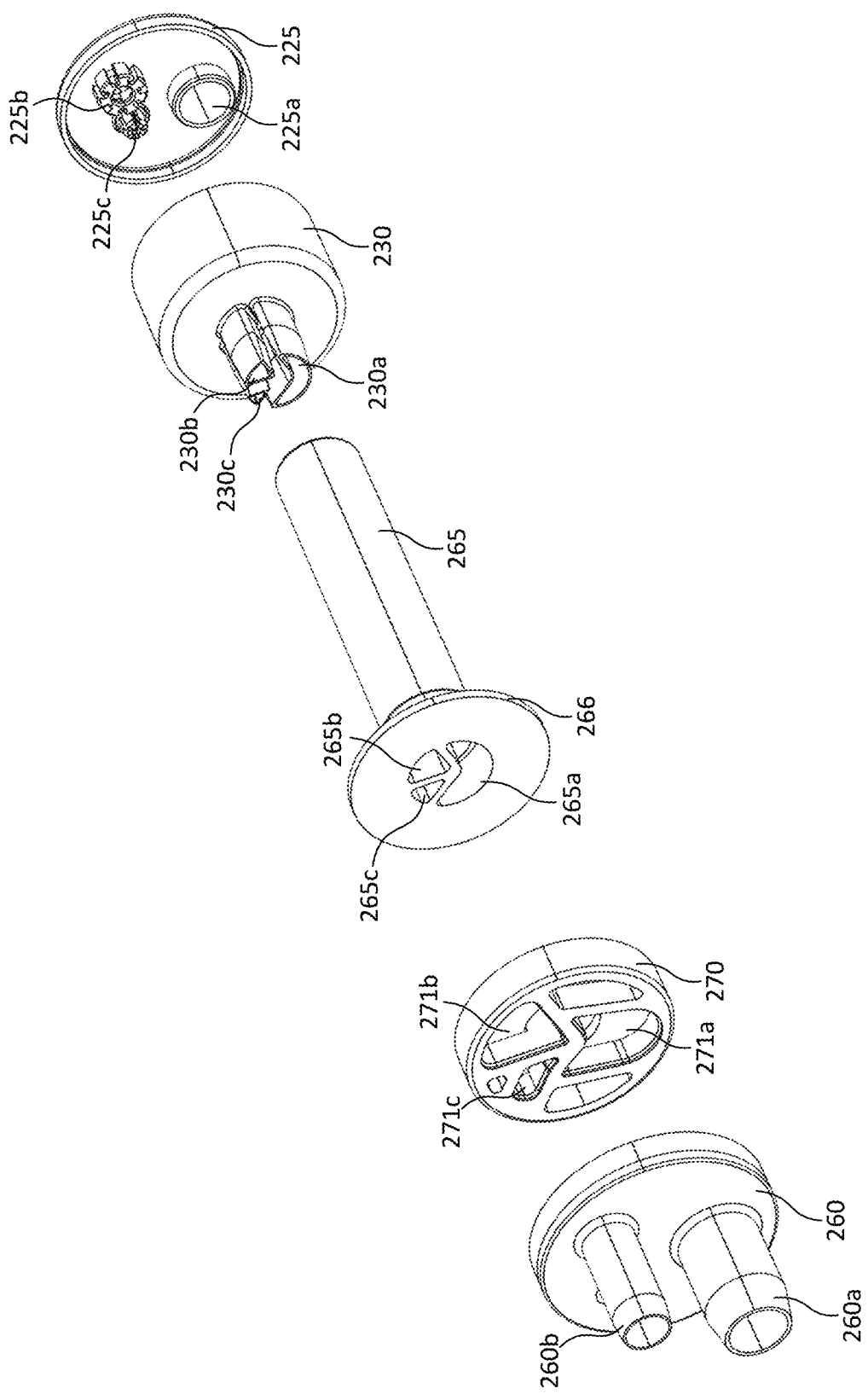
FIG. 2C depicts an exploded perspective view of an exemplary wall-traversing core with selected associated fluidly-connecting multi-lumen components.
Figure 2D:
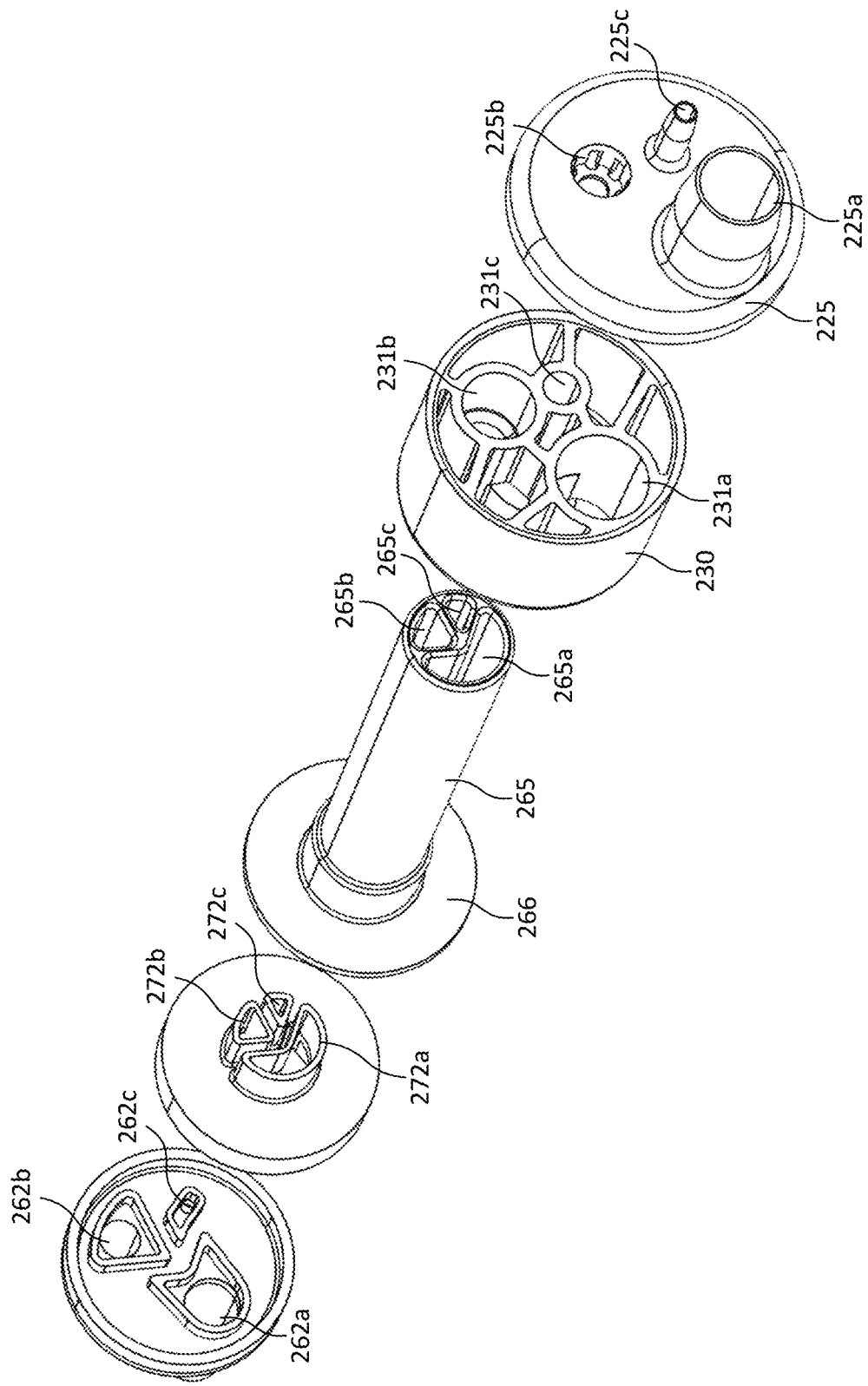
FIG. 2D depicts a second exploded perspective view of the exemplary wall-traversing core with selected associated fluidly-connecting multi-lumen components of FIG. 2C.

FIG. 2C depicts an exploded perspective view of an exemplary wall-traversing core with selected associated fluidly-connecting multi-lumen components. FIG. 2D depicts a second exploded perspective view of the exemplary wall-traversing core with selected associated fluidly-connecting multi-lumen components of FIG. 2C. Cap 225 is provided with N ports (in the depicted example, N=3), drain port 225a (depicted with an integrated hose barb fitting), water port 225b (depicted with an open aperture), and air port 225c (depicted with an integrated hose barb fitting). Water port 225b and air port 225c are each provided with a fenestrated protrusion configured to receive a floating ball element of a floating ball valve. The fenestrations may advantageously allow water and air to flow through port 225b and port 225c, respectively, even when the floating ball is in contact with the protrusion. Accordingly, the floating ball cannot occlude flow in the direction from the bell fitting 230 through the cap 225.

Cap 225 connects to bell fitting 230 such that each port connects to a respective one of N lumens of bell fitting 230. Drain port 225a fluidly communicates with drain lumen 231a, water port 225b fluidly communicates with water lumen 231b, and air port 225c fluidly communicates with air lumen 231c. Two floating ball elements (not shown in FIGS. 2C-2D) are configured to float in water lumen 231b and air lumen 231c. In either lumen, when fluid flow attempts to flow from the bell fitting 230 into the conduit core 265, the floating ball elements are thereby urged to occlude the apertures of the respective lumen.

Bell fitting 230 is adapted to channel fluid flow into the conduit core. As depicted, lumens 231a, 231b, and 231c are separately fluidly connected to lumens 230a, 230b, and 230c, respectively to form three (N=3) independent lumens through the bell fitting 230. The lumens 230a-c are formed as protrusions geometrically adapted to fit inside the respective independent lumens of wall-traversing conduit core 265. As depicted, lumens 230a-c of bell fitting 230 slidingly axially assemble into lumens 270 wall-traversing conduit core 265 such that each of the N lumens of the bell fitting 230 connects to a respective one of N lumens of the multi-lumen conduit core.

At least some portion of conduit core 265 may, by way of example and not limitation, be flexible (e.g., 'rubbery'). In some such embodiments, the lumens 230a-c may, for example, press-fit by hand into lumens 265a-c such that. As depicted, the tips of lumens 230a-c are sloped or chamfered on the external surfaces forming a single outer circumference circumscribing all the protruding lumens. The slopes or chamfered tips may, for example, advantageously assist in insertion of the lumens 230a-c into conduit core 265. As depicted, the various interconnecting lumens are provided with a geometric configuration (e.g., the depicted series of 'pie-shaped' wedges) which may, for example, advantageously ensure registration of the lumens 230a-c with conduit core 265.

Lumens 265a-c are substantially parallel to a longitudinal axis of 265, providing fluid communication between two ends of the conduit core 265. The depicted conduit core 265 is provided with a retaining lip 266. The retaining lip 266 aligns with and seals against channel core 270. Channel core 270 is provided with N independent protruding cavities 272a, 272b, and 272c. The protruding cavities 272a-c are configured (e.g., including shape and size) on a first side of channel core 270 to slidingly axially assemble and fluidly seal with lumens 265a-c, respectively, at an end of the conduit core 265 at an opposite end of the core from bell fitting 230. On a second side of channel core 270 (the opposite side of the channel core) cavities 271a-c independently fluidly communicate with the protruding cavities 272a-c to form N (where N=3 as depicted) cavities (which may also be referred to as lumens) through channel core 270. Cavities 271a-c are configured to independently fluidly seal to and communicate with lumens 260a, 260b, and 260c, respectively of end fitting 260. As depicted, lumens 260a-c are formed as tube-engaging ports 260a-c (e.g., hose fittings).

Figure 2E:
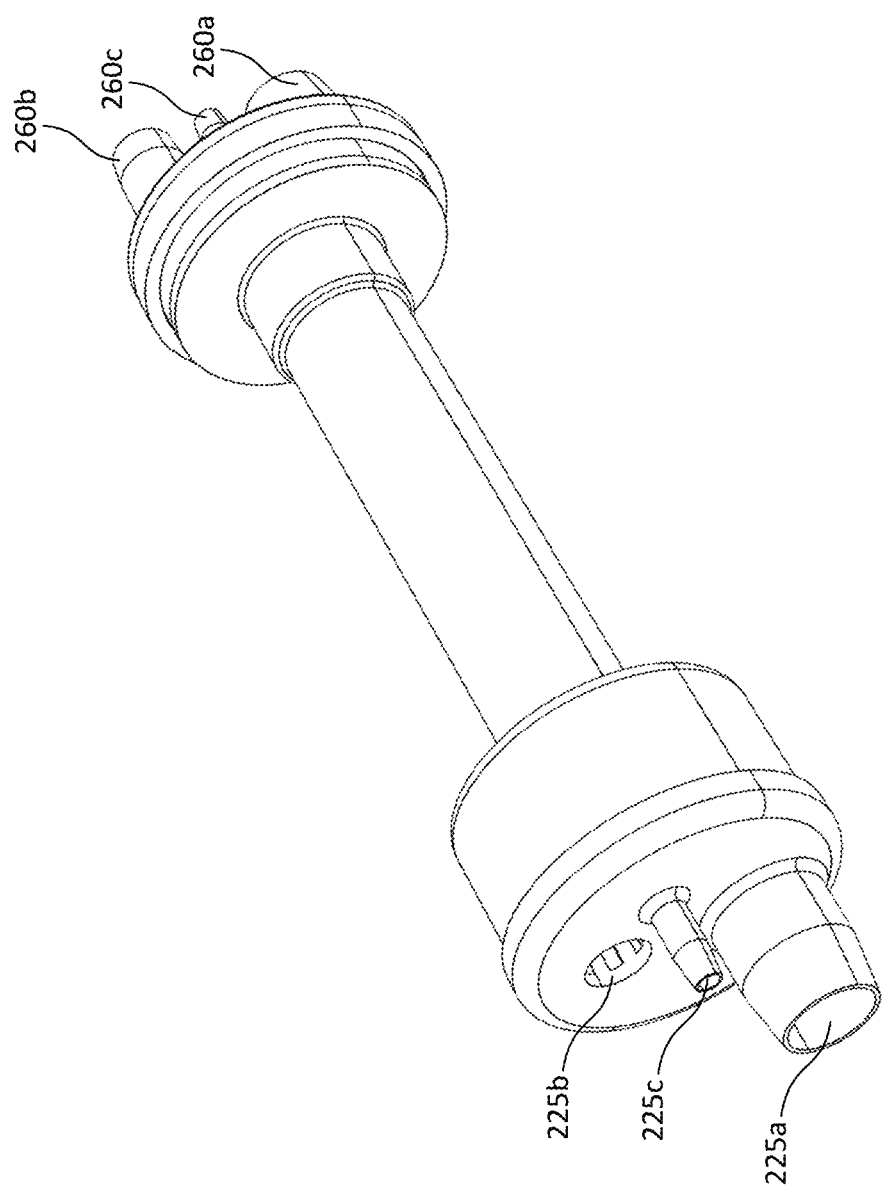
FIG. 2E depicts an assembled perspective view of the exemplary wall-traversing core with selected associated fluidly-connecting multi-lumen components of FIG. 2C.

FIG. 2E depicts an assembled perspective view of the exemplary wall-traversing core with selected associated fluidly-connecting multi-lumen components of FIG. 2C. Ports 260a, 260b, and 260c, fluidly communicate through the conduit assembly with ports 225a, 225b, and 225c, respectively. The various components assemble and fluidly seal and communicate to form three independent lumens through the conduit assembly. By way of example and not limitation, the conduit assembly may be assembled through the wall of a fluid reservoir, with ports 260a-c on an exterior of the reservoir and ports 225a-c on an interior of the reservoir. A first lumen may, for example, provide an independent fluid channel for fluid (e.g., water and air) to drain out of the reservoir through port 225a and out port 260a. A second lumen may, for example, provide an independent fluid channel for fluid (e.g., water) to flow into the reservoir through port 260b and out port 225b. A third lumen may, for example, provide an independent fluid channel for fluid (e.g., air) to flow into the reservoir through port 260c and out port 225c. The conduit system may, for example, advantageously provide fluid communication between the interior and exterior of the reservoir to, for example, provide for circulation of water and air through the interior of the reservoir.

Figure 2F:
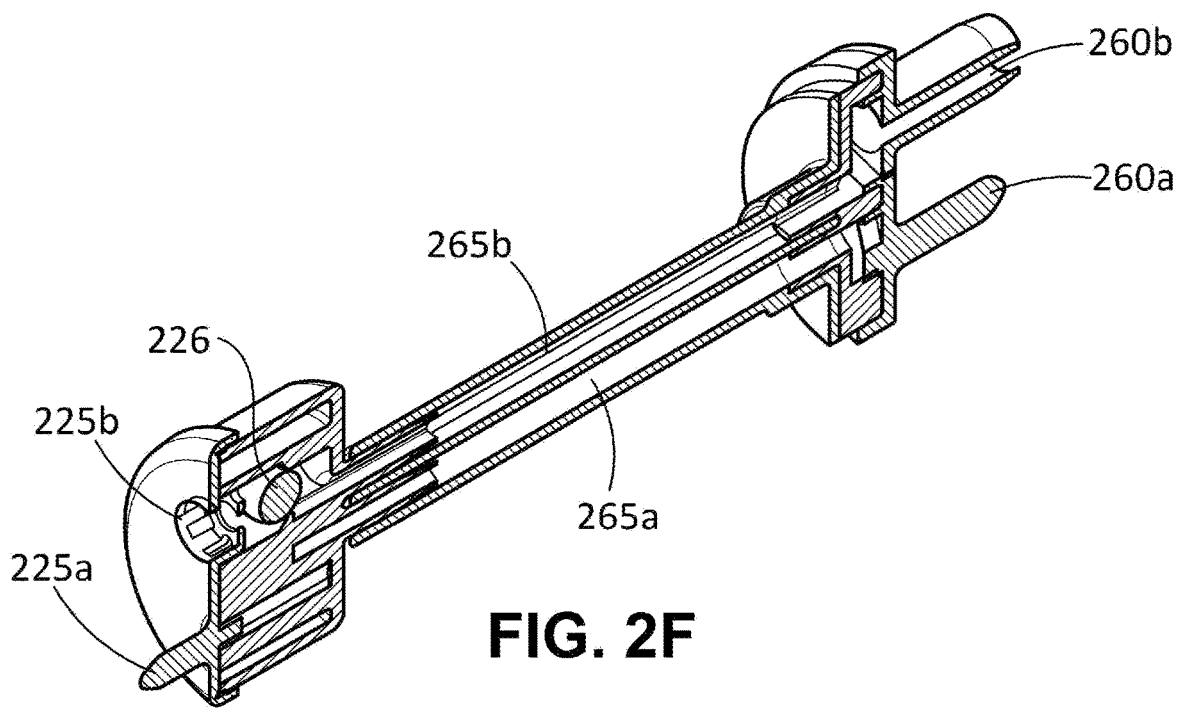
FIG. 2F depicts a first sectional view of the exemplary wall-traversing core with selected associated fluidly-connecting multi-lumen components of FIG. 2C.
Figure 2G:
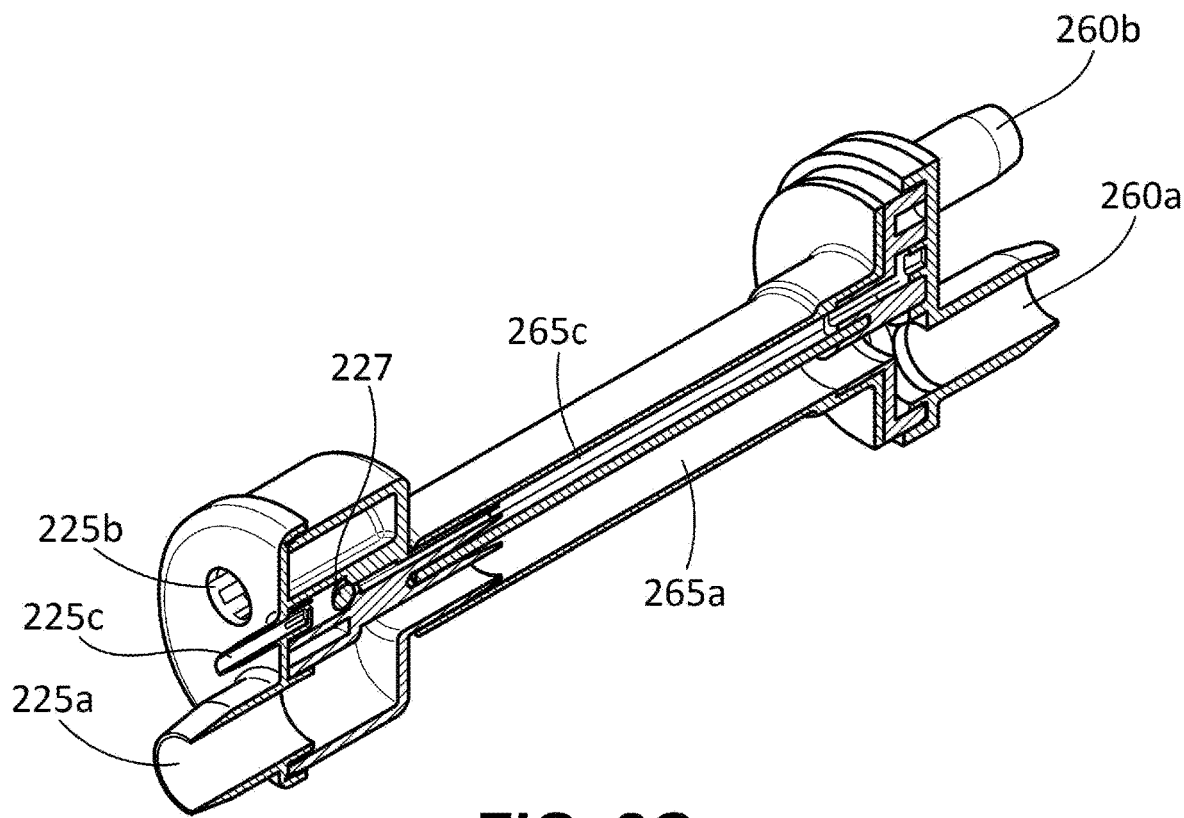
FIG. 2G depicts a second sectional view of the exemplary wall-traversing core with selected associated fluidly-connecting multi-lumen components of FIG. 2C.

FIG. 2F depicts a first sectional view of the exemplary wall-traversing core with selected associated fluidly-connecting multi-lumen components of FIG. 2C. FIG. 2G depicts a second sectional view of the exemplary wall-traversing core with selected associated fluidly-connecting multi-lumen components of FIG. 2C. An independent fluid channel is provided between port 260b, through lumen 265b of the conduit core, port 225b, and the various components therebetween. Floating ball 226 is provided in bell fitting 230. The lumen 230b of bell fitting 230 is configured such that the ball 226 restricts fluid flow in the direction for port 225b to port 260b. In the other direction (from port 260b to port 225*b*), the fenestrated protrusion of port 225*b* prevents occlusion of the lumen by the ball 226 and, therefore, allows fluid to flow through.

Another independent fluid channel is provided between port 260*a*, through lumen 265*a* of the conduit core, port 225*a*, and the various components therebetween. Yet another independent fluid channel is provided between port 260*c* (not shown), through lumen 265*c* of the conduit core, port 225*c*, and the various components therebetween. Floating ball 227 is provided in bell fitting 230. The lumen 230*c* of bell fitting 230 is configured such that the ball 227 restricts fluid flow in the direction for port 225*c* to port 260*c*. In the other direction (from port 260*c* to port 225*c*), the fenestrated protrusion of port 225*c* prevents occlusion of the lumen by the ball 227 and, therefore, allows fluid to flow through. Accordingly, the depicted three-lumen conduit system may, for example, advantageously provide for one-way communication of fluid (e.g., two separate fluids such as water and air) through two lumens (260*b* and 260*c*) and unrestricted communication of fluid through a third lumen.

Figure 3A:
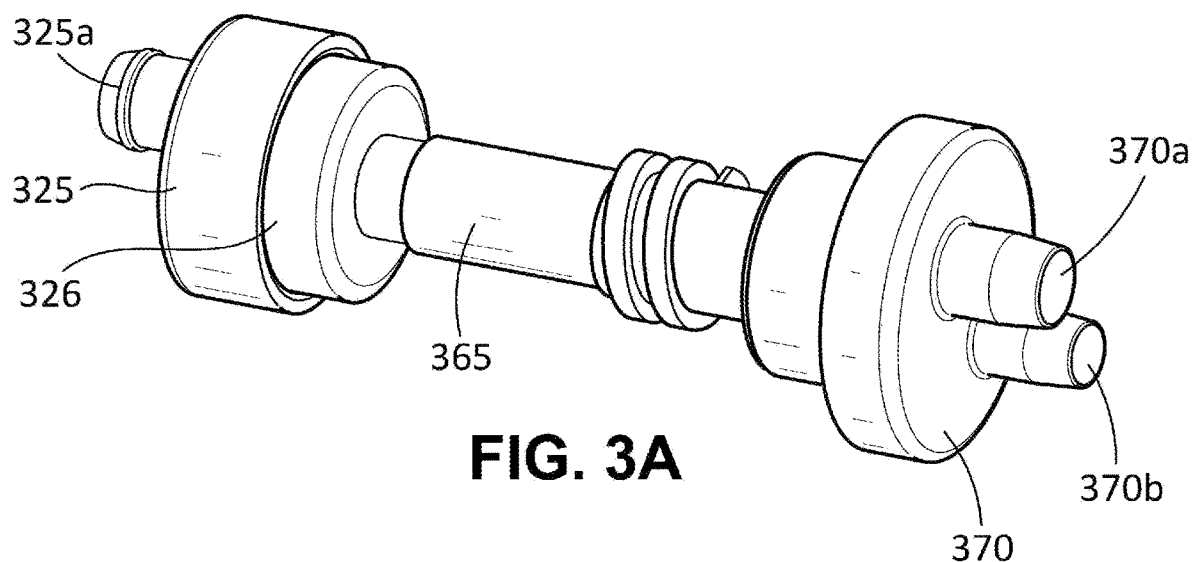
FIG. 3A depicts an assembled perspective view of selected components of a second exemplary bi-lumen bi-directional conduit system.
Figure 3B:
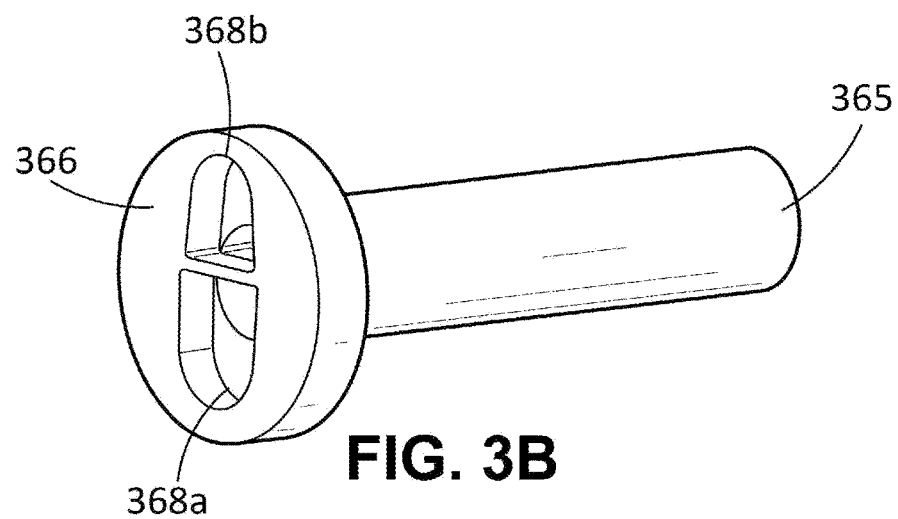
FIG. 3B depicts a first perspective sectional view of an exemplary bi-lumen wall-traversing core of the exemplary bi-directional conduit system of FIG. 3A.
Figure 3C:
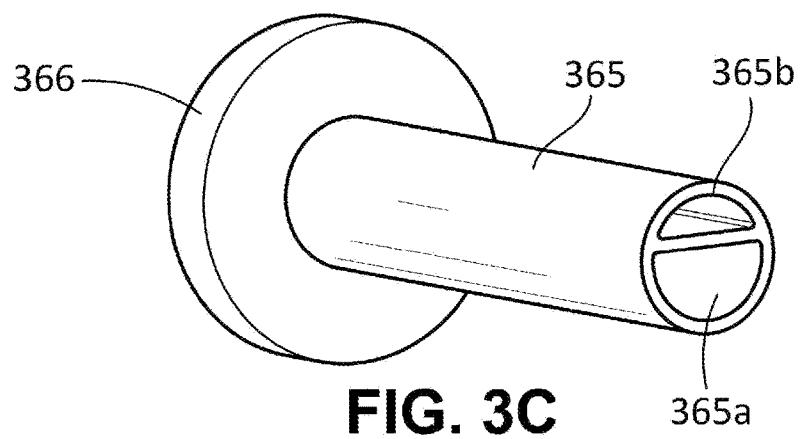
FIG. 3C depicts a second perspective sectional view of an exemplary bi-lumen wall-traversing core of the exemplary bi-directional conduit system of FIG. 3A.

FIG. 3A depicts an assembled perspective view of selected components of a second exemplary bi-lumen bi-directional conduit system. FIG. 3B depicts a first perspective sectional view of an exemplary bi-lumen wall-traversing core of the exemplary bi-directional conduit system of FIG. 3A. FIG. 3C depicts a second perspective sectional view of an exemplary bi-lumen wall-traversing core of the exemplary bi-directional conduit system of FIG. 3A. In the depicted exemplary multi-lumen conduit system, N=2.

Fitting 325 fluidly connects to bell fitting 326. Bell fitting 326 fluidly connects to conduit core 365. Conduit core 365 fluidly connects to cap 370. One independent lumen is defined through the various components including port 325*a*, lumen 365*a* and cavity 368*a*, and port 370*a*. A second independent lumen is defined through the various components including a second port (not shown) in fitting 325, lumen 365*b* and cavity 368*b*, and port 370*b*. A floating ball valve is provided to restrict flow from the second port in fitting 325 to port 370*b*, while allowing flow in the opposite direction from port 370*b* to the second port in fitting 325. Conduit core 365 is provided with retaining lip 366 to engage, for example, fitting 370. In various embodiments, the bi-lumen bi-directional core may, by way of example and not limitation, advantageously provide one-way fluid communication through the wall of a fluid reservoir for provision of water into the reservoir through one independent lumen (e.g., in port 370*b*) and unrestricted fluid communication through the wall through a second independent lumen (e.g., in port 370*a* and out port 325*a*).

Figure 4A:
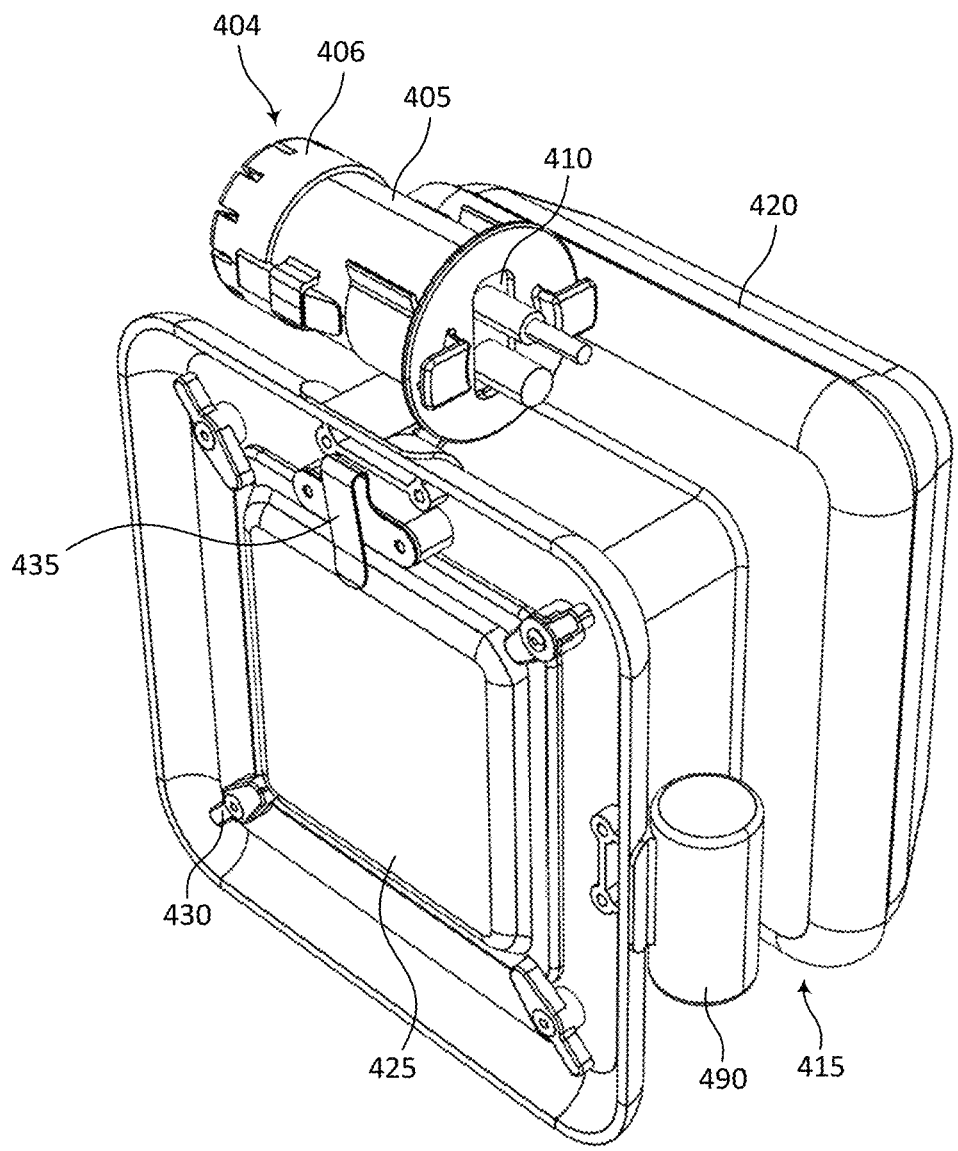
FIG. 4A depicts a perspective view of an exemplary modular pump system in a stowage mode.

FIG. 4A depicts a perspective view of an exemplary modular pump system in a stowage mode. Base unit 415 may, for example, provide power and control to one or more detachable accessories. Float 420 is releasably coupled to base unit 415 when in a stowage mode. For example, float 420 may be coupled to base unit 415 by one or more magnetic couplers. Pump assembly 404 is releasably coupled in a stowage mode to base unit 415. Pump assembly 405 includes pump 410, housing 405, and intake cap 406. Air pump 490 is releasably connected to base unit 415. In various embodiments, air pump 490 may be omitted.

Base unit 415 is provided with a clip 435, which may be, for example, omitted in some embodiments. The clip 435 may, for example, advantageously provide a means of attachment to a container or other apparatus such as, for example, the rim of a bucket or other container. Access to internal power storage (e.g., batteries) may, for example, be provided by access cover 425. Access cover 425 may be held in place by the four rotatable clips 430. The modular pump system may, for example, provide an easily portable and deployable power and control base unit with accessories including, for example, a water pump, an air pump, other accessories, or some combination thereof.

Figure 4B:
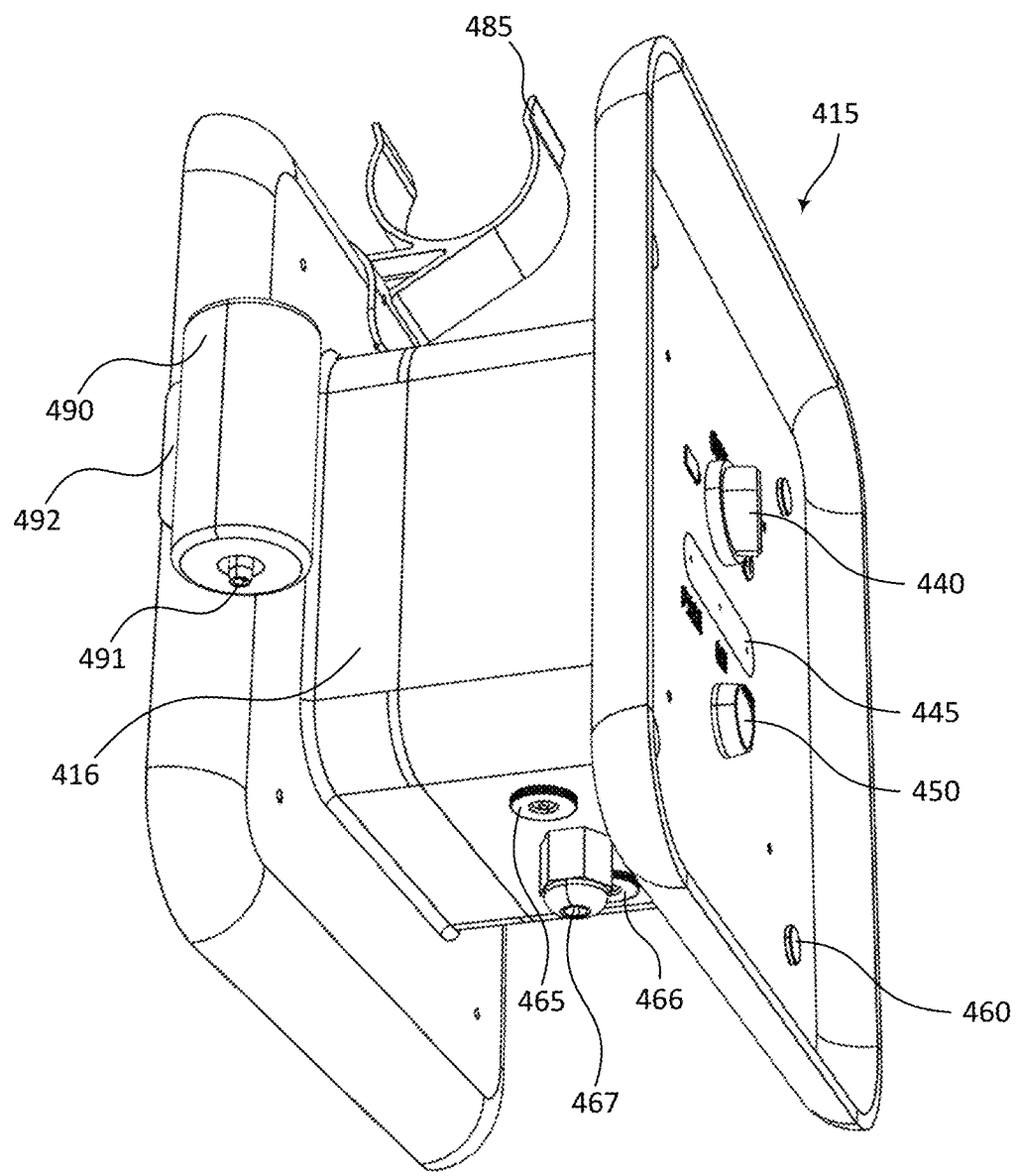
FIG. 4B depicts a perspective view of an exemplary base unit of the exemplary modular pump system of FIG. 4B in a deployment mode.

FIG. 4B depicts a perspective view of an exemplary base unit of the exemplary modular pump system of FIG. 4B in a deployment mode. In a deployment mode, water pump assembly 404 is removed from clip 485 and deployed as desired (e.g., as shown in FIG. 1 and FIG. 4B). Float 420 may, for example, be separated from base unit 415 by removing the float 420 from the four sets of magnets 460. Removing float 420 reveals various controls of base unit 415. Base unit 415 may, for example, be hung by clip 435 such that the controls may be, for example, advantageously viewed and accessed. Tubing, cables, or both connected to one or more accessories (e.g., water pump, air pump) may, for example, be wrapped about the smaller central portion 416 of base unit 415, such as in a stowage mode.

In the depicted example, controls include power switch 440, mode display 445, and mode selector input 450. In various embodiments, the base unit may include, by way of example and not limitation, various electronics and electrical components such as, for example, circuit board(s), processor(s), integrated circuit(s), wireless communication modules, other appropriate components, or some combination thereof. Various components may, for example, advantageously allow the base unit to receive input, provide feedback, control accessories, provide power, receive power, other desired functions, or some combination thereof. For example, mode selector 450 may allow a user to choose an operation mode for the water pump. For example, a user may select between 'high' mode in which the water pump is continuously operated at max power, a 'low' mode in which the water pump is continuously operated at a lower power level, and a 'maintenance' mode in which the water pump is intermittently operated (e.g., according to predetermined on and off durations or other appropriate schedule). The mode selector may, by way of example and not limitation, be a toggle switch, a flip-flop switch, a sliding switch, a momentary input switch, a touch sensor, or other appropriate switch.

Power may be provided to an accessory (e.g., such as a water pump or air pump) through power ports 465, 466, and 467. Power ports 465 and 466 may, for example, be pluggable connections (e.g., a banana cable fitting, cigarette lighter connection, or other appropriate pluggable receptacle). Power port 467 may, for example, be a removable or permanent cable attachment. For example, a cable providing power, control, or both, may be connected between the water pump and port 467. Power may be provided to air pump 490, for example, via a cable attached to port 465 or 466.

Air pump 490 is coupled to base unit 415 by connector 492. The air pump 490 may be releasably coupled by, for example, bolts, screws, clips, magnets, or other appropriate connection. Air pump 490 is provided with output fitting 491. Output fitting 491 may, by way of example and not limitation, be a tube fitting (e.g., a hose barb) configured to fluidly couple to a tubing (e.g., conduit 116 in FIG. 1).

Figure 4C:
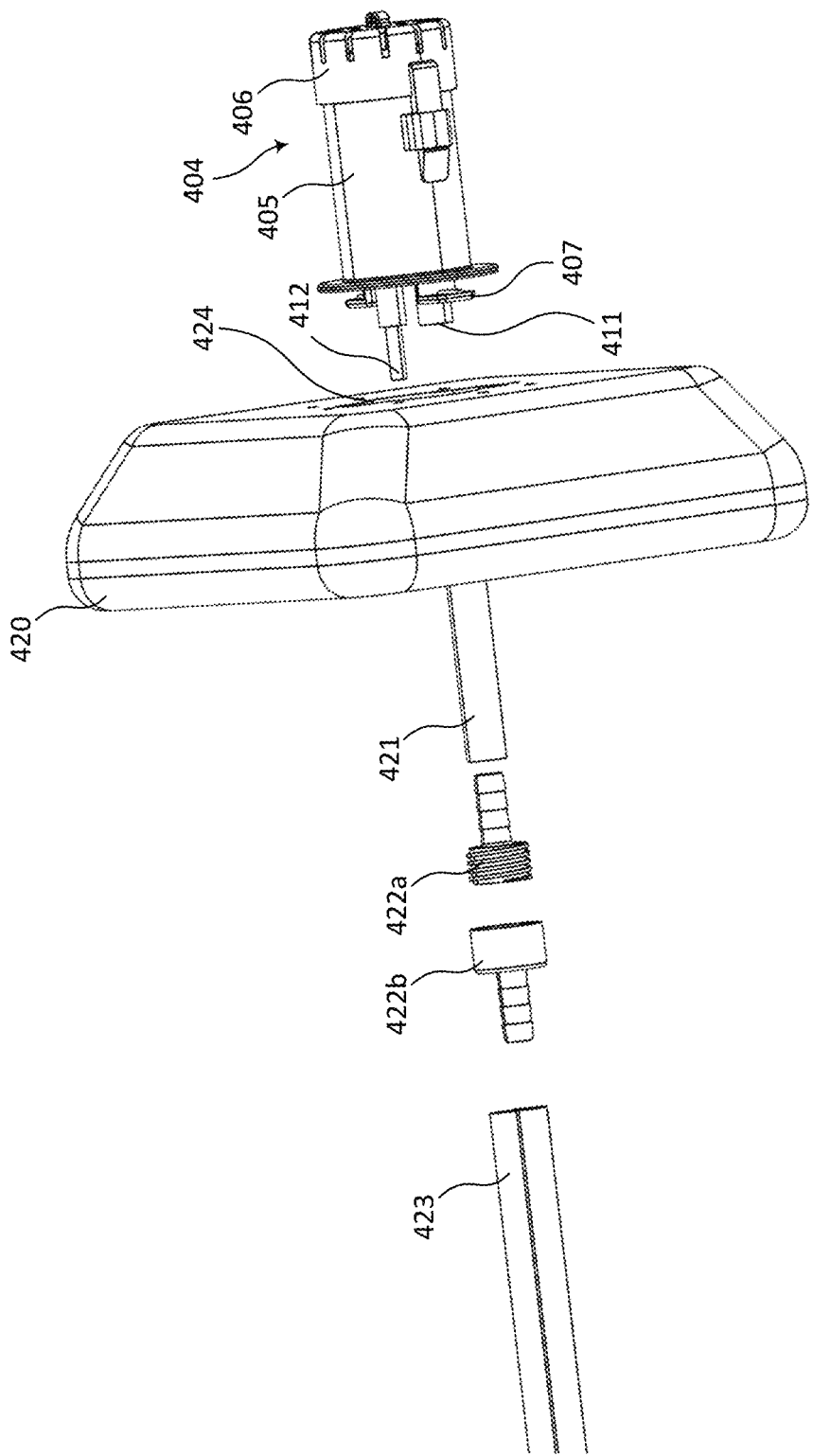
FIG. 4C depicts a perspective view of an exemplary pump and float of the exemplary modular pump system of FIG. 4B in a deployment mode.

FIG. 4C depicts a perspective view of an exemplary pump and float of the exemplary modular pump system of FIG. 4B in a deployment mode. Float 420 is provided with a coupling aperture 424. Housing 405 of water pump 404 is provided with clips 407. Coupling aperture 424 is configured to receive clips 407 therethrough in at least one rotational orientation. Coupling aperture 424 is further configured to releasably couple pump 404 and float 420 when the pump housing 405 is rotated in at least one rotational direction (e.g., approximately a quarter-turn) about a longitudinal axis through the pump. The pump 404 may be released from the float (e.g., to place in a stowage mode) by rotating, for example, in an opposite rotational direction (e.g., counter-clockwise). The float 420 may be provided, for example, with stops to prevent rotation of the pump past a predetermined point when clips 407 are engaged with coupling aperture 424. Accordingly, the pump 404 and pump 420 may be advantageously coupled and decoupled to transition, for example, between a stowage mode (e.g., decoupled and individually releasably coupled to base unit 415) and a deployed mode (e.g., decoupled from the base unit 415 and releasably coupled together).

Pump unit 410 is provided with a power connection 412 and water port 411. Tubing 421 is coupled to water port 411. Tubing 421 is provided with threadedly coupled tube fittings 422a and 422b. Tube fitting 422a couples tubing 421 and tube fitting 422b couples to tubing 423. Tubing 423 may, for example, be a multiple lumen tubing (e.g., 'double bubble' type tubing). In the depicted example, tubing 423 is provided with dual lumens. A first lumen is fluidly connected to the pump fluid port 411. The fluid port 411 may, for example, thence be fluidly connected to a port of a conduit such as shown in FIGS. 1-3C. A power cable may, for example, be passed through a second lumen of tubing 423 and connected to power port 412.

Although various embodiments have been described with reference to the figures, other embodiments are possible. For example, an improved bi-directional air and water conduit system disclosed herein may be configured to provide multiple isolated water/air input/output conduits for a container to efficiently and effectively perform both: (1) discharge of air and water from inside of the container, and (2) delivery an external source of air and water to outside of the container, for example to advantageously maintain a livable and sustainable habitat for live bait stored in the container. Various couplers and conduits may cooperate to deliver optimal fluid (including both gaseous and liquid fluid) egress and ingress (e.g., exhaust and/or aspiration) out of/into a bait container, and may advantageously reduce the effort required for proper maintenance of live bait within the container.

In various embodiments, an exemplary bi-directional air and water conduit system may be coupled to an exemplary cooler to exchange air and water in the cooler in two directions. Examples of a bi-directional air and water conduit are described with reference to, for example, at least FIGS. 1, 2I, and 2K in U.S. patent application Ser. No. 16/898,531, the entire contents of which are incorporated herein by reference. In various embodiments, the conduit system may be releasably coupled to a cooler, for example, through a drain port already provided in the cooler. In various embodiments, the conduit is provided with a wall traversing core which, for example, may be flexible, bendable, deformable, or some combination thereof. Such a wall traversing core may advantageously be contoured by a user to fit a particular container's structure. For example, some containers may have a depressed or 'sunken' region around the integrated drain port. In such containers, the wall traversing core may be advantageously contoured to the sunken region and through the drain port, while still maintaining a good seal with the wall.

In various examples, various aspects of the drain conduit may be selectively adjustable to control the amount of water draining out of one of the ports. For example, an adjustable valve may be used in some embodiments to selectively and continuously control the flow rate of water out of a port. In various implementations, a distal coupler may be configured with different sizes to adapt to different sizes of containers.

Various embodiments may be used in conjunction with various pumps. For example, a water-in port may couple to a water pump via a line or hose, an air-in port may couple to an air pump via a line or hose, and a drain port may be coupled to a drain pump. In some examples, a combined air and water pump is employed. Fluid pumped may include, for example, fresh water, salt water, air, or other desired fluid.

In various embodiments, a conduit may have a plurality of channels (e.g., 2, 3, or more). In some embodiments the conduit may, for example, be adapted to convey air and to convey water in two directions (e.g., ingress and egress). In some embodiments the conduit may, for example, have only two channels. Such two-channel conduits may, for example, be adapted to convey water in both directions. Some such embodiments may, for example, convey water only and not convey air, may only convey water in one direction, or some combination thereof.

In various embodiments, a conduit system may be provided with one or more adapters configured to create a fluid seal between the conduit and a wall of a container. Containers may include, by way of example and not limitation, soft- and hard-side coolers and clamshell containers (example brands include, e.g., Magellan, Yeti, Pelican, Igloo, Coleman, and Otter), buckets, storage containers, tanks (e.g., having a round, polygonal, or other suitable curvilinear cross-section), milk jugs, water bottles, or other suitable containers. In various embodiments, for example, the conduit may be provided as a kit with at least one sealing element (e.g., a gasket) suitable for at least one intended container. Some kits may include, for example, a flat gasket and a gasket with at least one curved side (e.g., flat on one side and concave on the other). Some kits may include, for example, one or more threadedly-connecting pressing element (e.g., a nut) which may be, for example, configured to advantageously fit at least one intended container.

In various embodiments, a base unit may be provided with a 'maintenance' mode. By way of example and not limitation, the 'maintenance' mode may, for example, cause the water pump, air pump, other accessories, or some combination thereof to be operated according to feedback from, for example, one or more sensors to maintain one or more predetermined parameters within a predetermined range(s). Exemplary parameters may include, by way of example and not limitation, oxygen level of water in a reservoir, level of one or more waste products or toxins in a reservoir, activity level of creatures (e.g., live bait) within a reservoir, temperature of fluid in a reservoir, other appropriate parameter(s), or some combination thereof.

In various embodiments, a pump unit may be configured to releasably couple to a base unit; and a base unit may be coupled to an exemplary water supply container. Various views illustrate exemplary features and structures for releasably coupling an exemplary pump unit to an exemplary base unit; releasably coupling an exemplary base unit to a container (e.g., a bait bucket) or modular accessory attachment (e.g., various cart panels as depicted in U.S. patent application Ser. Nos. 16/798,213, 63/053,221, 63/055,311, 63/089,921, 29/681,056, and documents incorporated thereinto, the contents of which are hereby expressly incorporated by reference). In various embodiments, the pump may be transitioned between a stowage mode and a pumping mode. The stowage mode may advantageously provide a compact assembly configuration which may be advantageous, for example, for transport and storage. A tubing (e.g., a dual channel "double bubble" tubing suitable for conducting water in one channel and confining a power and/or control cable in the other channel) may be wrapped around a center of the base unit.

In a deployed, or "pumping" mode, a conduit and modular pump system may, for example, advantageously convert any suitable container into a properly aerated bait bucket. For example, in pumping mode, the float may be released from the base unit, the pump may be removed from a clip, and the float and pump may be releasably coupled by a twist-lock connection. The tubing may be pre-connected to at least one of the pump and the base unit. The base unit may provide power and command signals to the pump. The base unit may be provided with user inputs to transition the pump between various operating modes (e.g., 'high' flow, 'medium' flow, 'low' flow, 'maintenance' or periodic flow). The base unit may be releasably coupled to a container such as, for example, a bucket or cooler. The base unit may be fluidly coupled to the container by a tubing. In various embodiments, the base unit may be fluidly coupled to the container at least partially via the conduit described in relation to Appendix A. The float and pump may, for example, be disposed in a body of water (e.g., a lake, pond, ocean, or large container) desirable for 'recharging' the water in the container. The pump may be oriented downwards into the water. When operated as commanded by the base unit, the pump may urge water up through the tubing, to the base unit, and thence into the container.

In various embodiments, the base unit may be provided with auxiliary power from an external power source such as, for example, a battery, a vehicle, a generator, a solar panel, shore power, or other suitable power supply. In some embodiments, the base unit may be provided with at least one auxiliary power supply out port which may be advantageously used to power one or more accessories.

In some embodiments, various ports separately couple to associated water and delivery hoses to facilitate the ingress of an exterior source of air and water (respectively) to the interior of a container to which a conduit system is operably coupled (e.g., such as is described and depicted in relation to Appendix A). An outlet port may couple, for example, to a drain hose to facilitate the egress of water and air from the interior of the container. Each outlet port may include a larger diameter at the port's distal end (in a hollow frusto-conical shape, for example) to facilitate a secure seal between the port and associated inlet/outlet hose.

In an exemplary aspect, a system includes a base module storing an electrical power source and a user selection control input, and releasably connectable to a fluid container (e.g., a bucket), a fluid transport system including an impeller electrically supplied by the base module to convey a fluid via a conduit in response to the user selection control input, wherein in a stored mode, the base module is configured to store the conduit and to mechanically support, releasably coupled, the impeller to the base module.

In various embodiments, for example, some bypass circuits implementations may be controlled in response to signals from analog or digital components, which may be discrete, integrated, or a combination of each. Some embodiments may include programmed and/or programmable devices (e.g., PLAs, PLDs, ASICs, microcontroller, microprocessor), and may include one or more data stores (e.g., cell, register, block, page) that provide single or multi-level digital data storage capability, and which may be volatile and/or non-volatile. Some control functions may be implemented in hardware, software, firmware, or a combination of any of them.

Although exemplary systems have been described with reference to the figures, other implementations may be deployed in other industrial, scientific, medical, commercial, and/or residential applications.

Temporary auxiliary energy inputs may be received, for example, from chargeable or single use batteries, which may enable use in portable or remote applications. Some embodiments may operate with other DC voltage sources, such as a 9V (nominal) batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave, etc. . . . ) inputs may include a line frequency transformer to provide voltage step-up, voltage step-down, and/or isolation.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits and/or other modules. In various examples, the modules may include analog and/or digital logic, discrete components, traces and/or memory circuits fabricated on a silicon substrate including various integrated circuits (e.g., FPGAs, ASICs). In some embodiments, the module(s) may involve execution of preprogrammed instructions and/or software executed by a processor. For example, various modules may involve both hardware and software.

Although various embodiments have been described with reference to the Figures, other embodiments are possible. A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

What is claimed is:

1. A conduit system comprising:
   a flexible conduit core having N independent lumens, where N is at least 3, each lumen fluidly connecting a first end of the core with a second end of the core and being substantially parallel to a longitudinal axis of the core, and the conduit core being configured to traverse a wall of a fluid reservoir through a pre-existing aperture therein;
   a first fitting configured to releasably couple to the first end of the core on a first side of the wall and having N independent lumens configured to fluidly communicate with the N independent lumens of the core, respectively;
   a first cap configured to couple to the first fitting and having N lumens configured to fluidly communicate with the N independent lumens of the first fitting, respectively;
   a second fitting configured to be coupled to the second end of the core on a second side of the wall and having N apertures configured to fluidly communicate with the N independent lumens of the core, respectively, wherein the conduit core, the first fitting, the first cap, and the second fitting are configured to assemble together into a conduit assembly such that:
- the N independent lumens of each are fluidly connected, respectively, to form N independent lumens through the conduit assembly, and
- the conduit assembly releasably couples to the wall to provide fluid communication therethrough between an interior and an exterior of the fluid reservoir;

a first valve element disposed in a fluid path of a first at least one of the N independent lumens and configured to selectively restrict flow in a first direction along the fluid path;

a riser conduit disposed in the interior of the fluid reservoir and provided with an aperture at a distal end of the conduit relative to the conduit assembly, the aperture being fluidly connected to at least one of the N independent lumens; and, a wall coupler configured to releasably couple the distal end of the riser conduit to the wall of the fluid reservoir.

2. The conduit system of claim 1, further comprising:

a first threaded coupler having inner threads and having outer threads configured to threadedly engage the pre-existing aperture in the wall of the fluid reservoir;

a second threaded coupler having: (i) a first set of outer threads configured to threadedly engage the inner threads of the first threaded coupler and (ii) a second set of outer threads; and a coupling ring having inner threads configured to threadedly engage the second set of outer threads of the second threaded coupler such that the second fitting and the second end of the conduit core are releasably coupled therebetween, wherein the first threaded coupler is configured to receive at least a portion of the conduit core therethrough when (i) the conduit core is releasably coupled between the coupling ring and the second threaded coupler and (ii) the second threaded coupler threadedly engages the first threaded coupler, such that when the conduit assembly is assembled together, the conduit assembly is thereby releasably coupled to the wall to provide fluid communication therethrough between the interior and an exterior of the fluid reservoir.

3. A conduit system comprising:

a conduit core having N independent lumens, wherein N is at least 3, each lumen fluidly connecting a first end of the core with a second end of the core and being substantially parallel to a longitudinal axis of the core, wherein the conduit core is configured to traverse a wall of a fluid reservoir through a pre-existing aperture therein;

a first fitting configured to releasably couple to the first end of the core and having N independent lumens configured to fluidly communicate with the N independent lumens of the core, respectively;

a second fitting configured to be coupled to the second end of the core and having N apertures configured to fluidly communicate with the N independent lumens of the core, respectively;

a first valve element disposed in a fluid path of a first at least one of the N independent lumens and configured to selectively restrict flow in a first direction along the fluid path;

a first threaded coupler having inner threads and having outer threads configured to threadedly engage the pre-existing aperture in the wall of the fluid reservoir;

a second threaded coupler having: (i) a first set of outer threads configured to threadedly engage the inner threads of the first threaded coupler and (ii) a second set of outer threads; and a coupling ring having inner threads configured to threadedly engage the second set of outer threads of the second threaded coupler such that the second fitting and the second end of the conduit core are releasably coupled therebetween, wherein the conduit core, the first fitting, and the second fitting are configured to assemble together into a conduit assembly such that the N independent lumens of each are fluidly connected, respectively, to form N independent lumens through the conduit assembly, and wherein the first threaded coupler is configured to receive at least a portion of the conduit core therethrough when (i) the conduit core is releasably coupled between the coupling ring and the second threaded coupler and (ii) the second threaded coupler threadedly engages the first threaded coupler, such that when the conduit assembly is assembled together, the conduit assembly is thereby releasably coupled to the wall to provide fluid communication therethrough between an interior and an exterior of the fluid reservoir.

4. The conduit system of claim 3, wherein the conduit core is flexible.

5. The conduit system of claim 3, further comprising a second valve element disposed in a fluid path of a second at least one of the N independent lumens and configured to selectively restrict flow in a second direction along the fluid path.

6. The conduit system of claim 5, wherein:
- the conduit assembly is configured to provide fluid communication through a wall of a fluid reservoir between the interior and the exterior of the fluid reservoir, and
- the first direction and the second direction are the same direction relative to the interior of the fluid reservoir.

7. The conduit system of claim 3, further comprising a riser conduit disposed in an interior of a fluid reservoir and provided with an aperture at a distal end of the conduit relative to the conduit assembly, the aperture being fluidly connected to at least one of the N independent lumens.

8. The conduit system of claim 7, wherein the riser conduit is flexible.

9. The conduit system of claim 7, further comprising a wall coupler configured to releasably couple the distal end of the riser conduit to the wall of the fluid reservoir.

10. The conduit system of claim 3, wherein the first fitting comprises N independent hollow protrusions at least partially defining the N independent lumens of the first fitting, respectively, and configured to releasably axially couple with the N independent lumens of the core, respectively.

11. The conduit system of claim 3, further comprising a channel core provided with N independent cavities and configured to fluidly connect the N independent lumens of the conduit core, respectively, to the N independent lumens of the second fitting, respectively, when assembled therebetween.

12. A conduit system comprising:

a flexible conduit core having N independent lumens, where N is at least 3, each lumen fluidly connecting a first end of the core with a second end of the core and being substantially parallel to a longitudinal axis of the core, and the conduit core being configured to traverse a wall of a fluid reservoir through a pre-existing aperture therein;

a first fitting configured to releasably couple to the first end of the core on a first side of the wall and having N independent lumens configured to fluidly communicate with the N independent lumens of the core, respectively;

a first cap configured to couple to the first fitting and having N lumens configured to fluidly communicate with the N independent lumens of the first fitting, respectively;

a second fitting configured to be coupled to the second end of the core on a second side of the wall and having N apertures configured to fluidly communicate with the N independent lumens of the core, respectively, wherein the conduit core, the first fitting, the first cap, and the second fitting are configured to assemble together into a conduit assembly such that:

the N independent lumens of each are fluidly connected, respectively, to form N independent lumens through the conduit assembly, and the conduit assembly releasably couples to the wall to provide fluid communication therethrough between an interior and an exterior of the fluid reservoir;

a first valve element disposed in a fluid path of a first at least one of the N independent lumens and configured to selectively restrict flow in a first direction along the fluid path; and, a riser conduit disposed in an interior of the fluid reservoir and provided with an aperture at a distal end of the conduit relative to the conduit assembly, the aperture being fluidly connected to at least one of the N independent lumens, wherein a first lumen of the N independent lumens through the conduit assembly is coupled to an air source, a second lumen of the N independent lumens through the conduit assembly is coupled to a water source, and the at least one of the N independent lumens that the riser conduit is fluidly connected to comprises a third lumen of the N independent lumens through the conduit assembly.

13. The conduit system of claim 12, further comprising a wall coupler configured to releasably couple the distal end of the riser conduit to the wall of the fluid reservoir.

14. The conduit system of claim 12, further comprising:

a first threaded coupler having inner threads and having outer threads configured to threadedly engage the pre-existing aperture in the wall of the fluid reservoir;

a second threaded coupler having: (i) a first set of outer threads configured to threadedly engage the inner threads of the first threaded coupler and (ii) a second set of outer threads; and a coupling ring having inner threads configured to threadedly engage the second set of outer threads of the second threaded coupler such that the second fitting and the second end of the conduit core are releasably coupled therebetween, wherein the first threaded coupler is configured to receive at least a portion of the conduit core therethrough when (i) the conduit core is releasably coupled between the coupling ring and the second threaded coupler and (ii) the second threaded coupler threadedly engages the first threaded coupler, such that when the conduit assembly is assembled together, the conduit assembly is thereby releasably coupled to the wall to provide fluid communication therethrough between the interior and an exterior of the fluid reservoir.

\* \* \* \* \*